(12) United States Patent
Anzai et al.

(10) Patent No.: US 7,027,292 B2
(45) Date of Patent: Apr. 11, 2006

(54) SOLID ELECTROLYTIC CAPACITOR AND MANUFACTURING METHOD THEREOF

(75) Inventors: Naoki Anzai, Ome (JP); Shogo Aizawa, Ome (JP); Tomohiro Matsuzaki, Ome (JP); Norihito Fukui, Ome (JP); Atsushi Yoshizawa, Ome (JP); Hidehiko Itoh, Ome (JP); Atsushi Yamada, Ome (JP); Katsumi Abe, Ome (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 10/509,550

(22) PCT Filed: Mar. 28, 2003

(86) PCT No.: PCT/JP03/04025

§ 371 (c)(1),
(2), (4) Date: Jun. 16, 2005

(87) PCT Pub. No.: WO03/088287

PCT Pub. Date: Oct. 23, 2003

(65) Prior Publication Data

US 2006/0050469 A1     Mar. 9, 2006

(30) Foreign Application Priority Data

Mar. 28, 2002  (JP) .............................. 2002-092614
Sep. 30, 2002  (JP) .............................. 2002-286210
Sep. 30, 2002  (JP) .............................. 2002-286213

(51) Int. Cl.
*H01G 4/32* (2006.01)
*H01G 9/04* (2006.01)
*H01G 9/02* (2006.01)

(52) U.S. Cl. ...................... 361/530; 361/525; 29/25.03

(58) Field of Classification Search ................ 361/523, 361/525–527, 530; 29/25.03
See application file for complete search history.

(56) References Cited

U.S. PATENT DOCUMENTS 6,307,735 B1 * 10/2001 Saito et al. .................. 361/517
6,515,847 B1 *  2/2003 Naraya ....................... 361/523

FOREIGN PATENT DOCUMENTS

JP   03-001518   1/1991
JP   04-058508   2/1992

* cited by examiner

Primary Examiner—Eric W. Thomas

(57) ABSTRACT

Negative electrode foil and positive electrode foil having an oxide coating layer formed on the surface thereof with a separator, the separator containing a binder constituted of a compound having a vinyl group, interposed therebetween are wound up to thereby form a capacitor element. The content of binder in the separator is adjusted to 10–20% based on the total weight of separator before subjecting the capacitor element to restoration and chemical conversion. After the restoration and chemical conversion, the capacitor element is immersed in a liquid mixture prepared by mixing a polymerizable monomer, an oxidizer and a given solvent together so that polymerization reaction of conductive polymer is effected in the capacitor element to thereby form a solid electrolyte layer. The thus obtained capacitor element is inserted in a sheath case, and its opening end is fitted with sealing rubber. Sealing is accomplished by fastening operation, and aging is performed. Thus, a solid electrolytic capacitor is obtained.

20 Claims, 5 Drawing Sheets

SOLID ELECTROLYTIC CAPACITOR AND MANUFACTURING METHOD THEREOF

TECHNICAL FIELD

The present invention relates to a solid electrolytic capacitor and a manufacturing method thereof, and more particularly to a solid electrolytic capacitor and manufacturing method thereof that reduces ESR, and improves electrostatic capacity and withstand voltage. The present invention also relates to a solid electrolytic capacitor and manufacturing method thereof that improves the withstand voltage and inhibits LC fluctuation after re-flowing.

BACKGROUND ART

Electrolytic capacitors that use tantalum, aluminum, or another metal with a valve action can attain a large capacity with a small size by giving the valve action metal that serves as the anode-side counter electrode the shape of a sintered body, an etching foil, or the like to expand the surfaces of the dielectric, and are therefore widely used in common practice. In addition to being small and having a large capacity and a low equivalent series resistance, solid electrolytic capacitors in which solid electrolytes are used as the electrolytes are, in particular, easy to package on a chip, are suitable for surface mounting, and posses other special characteristics, so these features are essential for miniaturizing, increasing the functionality, and lowering the costs of electronic equipment.

In this type of solid electrolytic capacitor, miniature and large capacity applications commonly have a structure in which an anode foil and cathode foil composed of aluminum or another valve action metal are, with a separator interposed therebetween, wound together to form a capacitor element, the capacitor element is impregnated with a driving electrolytic solution, and the capacitor element is housed in a case composed of synthetic resin or in a case composed of aluminum or another metal and then sealed. Aluminum, as well as tantalum, niobium, titanium, and other metals are used as the anode material, and the same type of metal as the anode material is used as the cathode material.

The 7,7,8,8-tetracyanoquinodimethane (TCNQ) complex and Manganese dioxide are known as the solid electrolytes used in solid electrolytic capacitors, but also available in recent years is technology (Japanese Patent Application Laid-open No. 2-15611) that features polyethylene dioxythiophene (hereinafter referred to as PEDT) or another electro-conductive polymer that has a low reaction velocity and excellent adhesion to the oxide film layer of an anodic electrode.

A solid electrolytic capacitor in which a solid electrolyte layer composed of PEDT or another electro-conductive polymer is formed on such a wound capacitor element is fabricated in the manner shown in FIG. 5. First, the surface of the anode foil composed of aluminum or another valve action metal is roughened by electrochemical etching in an aqueous chloride solution, a plurality of etching pits are formed, and voltage is thereafter applied to an aqueous solution of ammonium borate or the like to form a dielectric oxide film layer (chemical conversion). In the same manner as the anode foil, the cathode foil is also composed of aluminum or another valve action metal, but the surface thereof is subjected to etching alone.

The anode foil on the surface of which an oxide film layer is formed and the cathode foil on which etching pits alone are formed are wound together via an interposed separator to form a capacitor element. Next, a capacitor element that has been subjected to chemical repair is sprayed with separately discharged 3,4-ethylene dioxythiophene (hereinafter referred to as EDT) or another polymerizable monomer, or is impregnated with a mixed liquid of both, and polymerization reactions are accelerated in the capacitor element to produce a solid electrolyte layer composed of PEDT or another electroconductive polymer. The capacitor element is thereafter encased in a cylindrical outer case with a closed end to fabricate a solid electrolytic capacitor.

In recent years, however, solid electrolytic capacitors as described above have come to be used in on-board equipment in vehicles. The drive voltage for an on-board circuit is ordinarily 12V, and a high withstand voltage of 25V is required in solid electrolytic capacitors. However, when manufacturing such a high withstand voltage product with a conventional manufacturing method such as that described above, there is a drawback in that the rate at which shorting occurs in the aging step is high, and the yield is low.

High-melting lead-free solder has come to be used in recent years due to environmental concerns, and the solder reflow temperature has risen from a range of 200 to 220° C. to a range of 230 to 270° C. However, performing solder reflow under such high temperatures has a drawback in that the withstand voltage is reduced. For this reason, a strong need exists for the development of a solid electrolytic capacitor whose withstand voltage characteristics do not degrade even when high temperature reflow soldering is carried out.

Such problems are not limited to the use of EDT as the polymerizable monomer, and the same drawbacks occur when other thiophene derivatives, pyrrole, aniline, or the like are used.

A first object of the present invention is to provide a solid electrolytic capacitor and a manufacturing method thereof that allow the ESR to be reduced and the electro-static capacity to be improved.

A second object of the present invention is to provide a solid electrolytic capacitor and a manufacturing method thereof that reduce the ESR and improve the electrostatic capacity and withstand voltage.

A third object of the present invention is to provide a solid electrolytic capacitor and a manufacturing method thereof that can improve the yield when manufacturing high withstand voltage products.

A fourth object of the present invention is to provide a solid electrolytic capacitor and a manufacturing method thereof that can improve withstand voltage and inhibit LC fluctuation after reflow.

DISCLOSURE OF THE INVENTION

The present invention is a solid electrolytic capacitor in which a separator containing a compound with a vinyl group is used, wherein the ESR is reduced and electrostatic capacity is improved by suitably adjusting the content of the compound with a vinyl group in the separator.

In a solid electrolytic capacitor in which a separator containing a compound with a vinyl group is used, the ESR can be reduced and the electrostatic capacity and withstand voltage improved by adding a predetermined coupling agent and a surfactant to the capacitor element prior to impregnation with a polymerizable monomer and oxidizing agent.

Furthermore, in a solid electrolytic capacitor in which a separator containing a compound with a vinyl group is used, degradation of the withstand voltage characteristics due to lead-free reflow can be prevented and the yield when manufacturing a high withstand voltage product can be improved by impregnating the capacitor element with a borate compound or another additive solution, forming a conjugate composed of a compound having a vinyl group and a borate compound or another additive, and thereafter forming a solid electrolytic layer composed of an electroconductive polymer.

In a solid electrolytic capacitor in which a separator containing a compound with a vinyl group is used, the withstand voltage is improved and LC fluctuation after reflow can be inhibited by impregnating a capacitor element with a polyimide silicon solution, and forming a film composed of polyimide silicon and a compound with a vinyl group.

Figure 1:
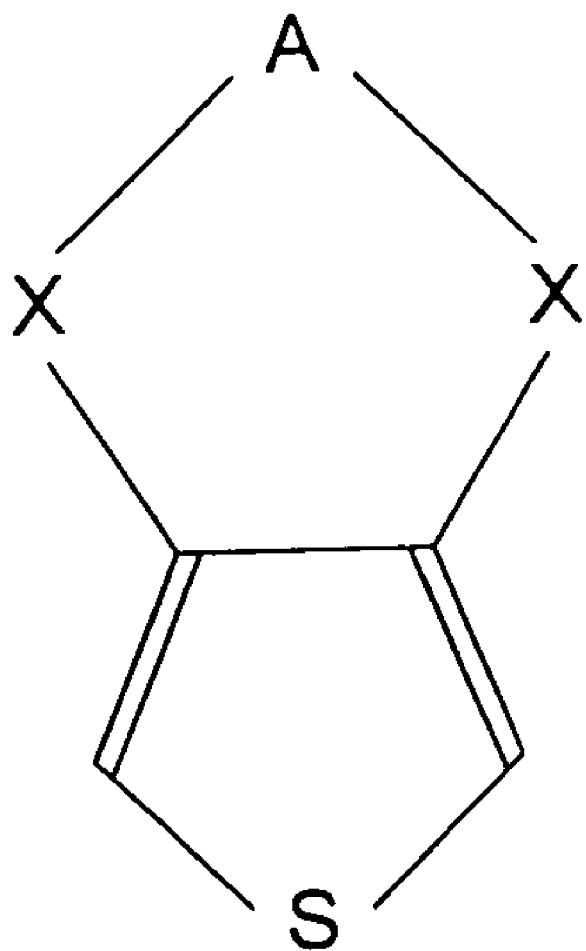
FIG. 1 is a diagram showing the structural formula of a thiophene derivative.

BEST MODE FOR CARRYING OUT THE INVENTION (A) First Embodiment

The present inventors, as a result of thoroughgoing research to achieve the first object, discovered that the ESR is reduced and the electrostatic capacity is improved by configuring the binder of the separator with a compound having a vinyl group, and making this binder 10 to 20% of the total weight of the separator.

In other words, the present inventors conducted studies while varying the content of the binder composed of a compound with a vinyl group to conduct the investigation, and discovered that when the above-described range is exceeded, ESR and the electrostatic capacity characteristics are reduced, and that the characteristics remain constant when the content is less than this range.

(A-1) Method for Manufacturing the Solid Electrolytic Capacitor

The method for manufacturing the solid electrolytic capacitor in the first embodiment is described below. That is, a cathode foil and an anode foil, with an oxidized film layer formed on the surface and a separator interposed therebetween, are wound together to form a capacitor element, and prior to subjecting the capacitor element to chemical repair the content of the binder in the separator is adjusted to 10 to 20% with respect to the total weight of the separator.

After the chemical repair, the capacitor element is immersed in mixed liquid prepared by mixing a polymerizable monomer and an oxidizing agent together with a predetermined solvent, a polymerization reaction of the electroconductive polymer is induced in the capacitor element, and a solid electrolyte layer is formed. The capacitor element is then inserted in an outer case; sealing rubber is mounted in the open-end portion and sealed with a tightening operation; and the unit is thereafter aged to form a solid electrolytic capacitor.

(A-2) Separator

A separator for a solid electrolytic capacitor principally composed of synthetic resin is ordinarily composed of a binder that joins the synthetic resin and other components together. The synthetic resin itself may be used as the binder, or the synthetic resin may be made into a fibrous form and melted in the separator fabrication process to form the main fiber.

It was discovered in the first embodiment that adequate results can be obtained when a separator is used in which a compound with a vinyl group is used as a binder, and the content of the binder in the separator prior to chemical repair is 10 to 20%, and is more preferably 13 to 17%, with respect to the total weight of the separator.

Here, polyvinyl alcohol (PVA), polyvinyl acetate, polyvinyl pyrrolidone, polyacrylamide, or the like may be used as the compound with a vinyl group, but among these PVA is preferred. Polyester fiber or nylon fiber with excellent thermal resistance is preferred as the main fiber of the separator. A separator composed of vinylon fiber is not suitable because lead-free reflow characteristics cannot be satisfied.

Described next is a method for adjusting the content of the binder in the separator prior to chemical repair to the above-stated range. A separator containing 10% or more of a binder composed of a compound with a vinyl group is obtained in which the binder in the separator is dissolved with a hot water immersion treatment and adjusted to the above-described range.

In the case of hot water immersion treatment, the temperature of the hot water is preferably 60 to 100° C. at which PVA and the like dissolve, and the hot water immersion treatment time is preferably 5 to 180 minutes, but is more preferably 20 to 60 minutes. The hot water immersion treatment is preferably performed with running water because PVA or the like dissolves faster and more uniformly.

This hot water immersion treatment is preferably performed after the capacitor element has been formed. When the hot water immersion treatment is performed prior to the formation of the capacitor element, the strength of the separator is reduced, so the winding strength during winding is reduced, the formation state of the electroconductive polymer in the capacitor element is worsened, and the characteristics are degraded.

(A-3) EDT and Oxidizing Agent

When EDT is used as the polymerizable monomer, an EDT monomer can be used as the EDT with which the capacitor element is impregnated, but a monomer solution in which EDT and a volatile solvent are mixed in a volume ratio of 1:0 to 1:3 may also be used.

Pentane or another hydrocarbon, tetrahydrofuran or another ether, ethyl formate or another ester, acetone or another ketone, methanol or another alcohol, or acetonitrile or another nitrogen compound may be used as the volatile solvent, but preferably used among these is methanol, ethanol, acetone, or the like.

Ferric p-toluenesulfonate dissolved in ethanol, or an aqueous solution of periodic acid or iodic acid can be used as the oxidizing agent, and the concentration of the oxidizing agent with respect to the solvent is preferably 40 to 58 wt %, and is more preferably 45 to 57 wt %. The ESR decreases with increased concentration of the oxidizing agent with respect to the solvent. A volatile solvent used for the above-described monomer solutions may be used as the solvent for the oxidizing agent, and among these ethanol is advantageous. The reason that ethanol is advantageous as the solvent for the oxidizing agent is believed to be that the vapor pressure is low, so evaporation easily occurs, and the remaining amount is small.

(A-4) Chemical Conversion Solution for Chemical Repair

Ammonium dihydrogen phosphate, diammonium hydrogen phosphate, or another phosphate-based chemical conversion solution; ammonium borate or another boric acid-based chemical conversion solution; or ammonium adipate or another adipic acid-based chemical conversion solution may be used as the chemical conversion solution for chemical repair, but preferably used among these is ammonium dihydrogen phosphate. The immersion time is preferably 5 to 120 minutes.

(A-5) Other Polymerizable Monomers

The polymerizable monomer used in the present invention may be, in addition to the above-described EDT, a thiophene derivative, aniline, pyrrole, furan, acetylene, or a derivative thereof other than EDT, as long as oxidation polymerization is carried out with a predetermined oxidizing agent to form a polymerizable monomer. Substances with the structural formula shown in FIG. 1 may be used for the thiophene derivative.

In the formula of FIG. 1, X is O or S.

When X is O, then A is an alkylene or a polyoxyalkylene.

When at least one X is S, then A is an alkylene, polyoxyalkylene, substituted alkylene, or substituted polyoxyalkylene.

Here, the substituent group is an alkyl group, alkeyl group, or alkoxy group.

(A-6) Operation and Effect of the First Embodiment

Following are believed to be the reasons that adequate results can be obtained by using a compound having a vinyl group as a binder for the separator and maintaining the content of the binder prior to chemical repair at 10 to 20% with respect to the total weight of the separator, as described above. In other words, constant amounts were obtained when a comparison was made between the amounts in which the resulting PEDT or other electroconductive polymer was retained in a separator in which the binder content was in the indicated range, and a separator in which the binder content exceeded the indicated range. When a separator in which the binder content is in this range is used, the characteristics of the solid electrolytic capacitor are improved, and when a separator in which the binder content exceeds this range is used, the characteristics of the solid electrolytic capacitor are degraded.

Due to this fact, it is possible that when a large quantity of a compound with a vinyl group is present as a binder component in a process in which PEDT or another electroconductive polymer is used, this compound negatively affects the formation of PEDT, and the inherent characteristics (electrostatic capacity, ESR) of PEDT or another electroconductive polymer cannot be obtained. It is thought that adequate results were obtained by suitably adjusting the amount of the compound with a vinyl group as a binder component.

(A-7) Examples Related to the First Embodiment

The invention of the first embodiment is described next on the basis of Examples A1 to A5 and Comparative Example A1 manufactured in the manner described below.

EXAMPLE A1

PET fiber was used as the main fiber, and a solid electrolytic capacitor was fabricated as follows by using a separator containing 15% of a binder composed of PVA. An electrode-forming device was connected to the cathode foil and anode foil on whose surface an oxide film layer had been formed, and both electrode foils were wound with the interposed separator to form a capacitor element whose element shape was 5$\phi$×2.8 L. This capacitor element was immersed for 20 minutes in hot water at a temperature of 100° C., and the binder content was adjusted to 13% after the hot water immersion treatment. The capacitor element was immersed for 40 minutes in ammonium dihydrogen phosphate, and chemical repair was carried out.

EDT and an ethanol solution of 45% ferric p-toluenesulfonate were mixed in a container, the capacitor element was immersed for 10 seconds in the mixed liquid and heated for 60 minutes at 120° C., and a PEDT polymerization reaction was induced in the capacitor element to form a solid electrolyte layer.

The capacitor element was inserted into a cylindrical outer case with a closed end, and sealing rubber was mounted in the open-end portion and sealed with a tightening operation. Aging was thereafter carried out for 120 minutes at 150° C. with an applied voltage of 8.2 V to form a solid electrolytic capacitor. The rated voltage of the solid electrolytic capacitor was 6.3 WV, and the rated capacity was 120 μF.

EXAMPLE A2

Using a separator containing 25% of a binder composed of PVA, a capacitor element was formed and immersed for 20 minutes in hot water at a temperature of 100° C., and after the hot water immersion treatment the binder content was adjusted to 14%. Other conditions and steps were the same as Example A1.

EXAMPLE A3

Using a separator containing 30% of a binder composed of PVA, a capacitor element was formed and immersed for 10 minutes in hot water at a temperature of 100° C., and after the hot water immersion treatment the binder content was adjusted to 20%. Other conditions and steps were the same as Example A1.

EXAMPLE A4

Using a separator containing 30% of a binder composed of PVA, a capacitor element was formed and immersed for 20 minutes in hot water at a temperature of 100° C., and after the hot water immersion treatment the binder content was adjusted to 15%. Other conditions and steps were the same as Example A1.

COMPARATIVE EXAMPLE A1

Using a separator containing 30% of a binder composed of PVA, chemical repair was carried out without hot water immersion treatment. Other conditions and steps were the same as Example A1.

[Comparison of the Results]

The initial characteristics of the Examples A1 to A5 and Comparative Example A1 carried out as described above were investigated and the results shown in Table 1 were obtained.

TABLE 1

| | CONTENT OF BINDER (%) | IMMERSION TIME IN HOT WATER (MINUTES) | CONTENT OF BINDER AFTER IMMERSION TREATMENT (%) | INITIAL CHARACTERISTICS | |
|---|---|---|---|---|---|
| | | | | CAP (µF) | ESR (Ω/ 100 kHz) |
| EXAMPLE A1 | 15 | 20 | 13 | 141 | 0.0185 |
| EXAMPLE A2 | 25 | 20 | 14 | 139 | 0.0185 |
| EXAMPLE A3 | 30 | 10 | 20 | 130 | 0.0200 |
| EXAMPLE A4 | 30 | 20 | 15 | 138 | 0.0186 |
| COMPARATIVE EXAMPLE A1 | 30 | — | 30 | 120 | 0.0215 |

As a result of comparing Examples A3 and A4 with Comparative Example A1 in which a separator containing 30% binder composed of PVA was used, it is apparent from Table 1 that both the electrostatic capacity and ESR of Examples A3 and A4 were superior to Comparative Example A1 in which hot water immersion was not carried out. The results furthermore indicate that both the electrostatic capacity and ESR of Example A4, in which the hot water immersion time was longer, were superior to Example A3.

(C) Second Embodiment

The present inventors, as a result of thoroughgoing research to achieve the second object, succeeded in obtaining a solid electrolytic capacitor and a manufacturing method thereof that can reduce the ESR and improve the electrostatic capacity and withstand voltage by using a separator that contains as a binder 10 wt % or more of a compound having a vinyl group, and adding one or two compounds selected from acetylene diol and dimethyl lauryl amine oxide to the capacitor element prior to impregnation with a polymerizable monomer and an oxidant.

(C-1) Method for Manufacturing the Solid Electrolytic Capacitor

The method for manufacturing the solid electrolytic capacitor in the second embodiment is described below. That is, a cathode foil and an anode foil, with an oxidized film layer formed on the surface and a separator that contains as a binder 10 wt % or more of a compound having a vinyl group interposed therebetween, are wound together to form a capacitor element, and the capacitor element is subjected to chemical repair. After adding to the capacitor element one or two compounds selected from acetylene diol and dimethyl lauryl amine oxide, the capacitor element is immersed in a mixed liquid of a polymerizable monomer and an oxidizing agent, and a polymerization reaction involving the electroconductive polymer is induced in the capacitor element to form a solid electrolyte layer. The capacitor element is then inserted in an outer case; sealing rubber is mounted in the open-end portion and sealed with a tightening operation; and the unit is thereafter aged to form a solid electrolytic capacitor.

(C-2) Separator

A separator for a solid electrolytic capacitor principally composed of synthetic resin is ordinarily composed of a binder that joins the synthetic resin and other components together. The synthetic resin itself may be used as the binder, or the synthetic resin may be made into a fibrous form and melted in the separator fabrication process to form the main fiber. Used in the present invention is a separator in which a compound with a vinyl group is used as a binder.

Here, polyvinyl alcohol (PVA), polyvinyl acetate, polyvinyl pyrrolidone, polyacrylamide or the like may be used as the compound with a vinyl group, but among these PVA is preferred.

The use of polyester fiber or nylon fiber with excellent thermal resistance as the main fiber of the separator is advantageous in that thermal resistance is improved. The content of the binder composed of a compound with a vinyl group is preferably 10 wt % or more with respect to the separator. When the content is less than 10 wt %, sufficient effect cannot be obtained.

(C-3) Additives

It was found that when one or two compounds selected from acetylene diol and dimethyl lauryl amine oxide as surfactants are added as additives to the capacitor element, the electrostatic capacity increases and the ESR decreases. It is thought that the reason for this is that the adhesiveness of PVA and PEDT is increased.

A preferred method for adding these additives to the capacitor element is to carry out chemical repair, immerse the capacitor element at normal temperature in 0.1 to 10%, and more preferably 0.5 to 2% aqueous solution, dry the capacitor element at 50 to 90° C., and thereafter carry out heating treatment at 150 to 200° C. It is thought that this heating improves the bridged state of the PVA, PEDT, and surfactant, and increases the adhesiveness.

(C-4) EDT and Oxidizing Agent

When EDT is used as the polymerizable monomer, an EDT monomer can be used as the EDT with which the capacitor element is impregnated, but a monomer solution in which EDT and a volatile solvent are mixed at a volume ratio of 1:0 to 1:3 may also be used.

Pentane or another hydrocarbon, tetrahydrofuran or another ether, ethyl formate or another ester, acetone or another ketone, methanol or another alcohol, or acetonitrile or another nitrogen compound may be used as the volatile solvent, but preferably used among these is methanol, ethanol, acetone, or the like.

Ferric p-toluenesulfonate dissolved in ethanol, or an aqueous solution of periodic acid or iodic acid can be used as the oxidizing agent, but the concentration of the oxidizing agent with respect to the solvent is preferably 40 to 65 wt %, and is more preferably 45 to 57 wt %. The ESR decreases with increased concentration of the oxidizing agent with respect to the solvent. A volatile solvent used for the above-described monomer solutions may be used as the solvent for the oxidizing agent, and among these ethanol is advantageous. The reason that ethanol is advantageous as the solvent for the oxidizing agent is believed to be that the vapor pressure is low, so evaporation easily occurs, and the remaining amount is small.

(C-5) Chemical Conversion Solution for Chemical Repair

Ammonium dihydrogen phosphate, diammonium hydrogen phosphate, or another phosphate-based chemical conversion solution; ammonium borate or another boric acid-based chemical conversion solution; or ammonium adipate or another adipic acid-based chemical conversion solution may be used as the chemical conversion solution for chemical repair, but preferably used among these is ammonium dihydrogen phosphate. The immersion time is preferably 5 to 120 minutes.

(C-6) Other Polymerizable Monomers

The polymerizable monomer used in the present invention may be, in addition to the above-described EDT, a thiophene derivative, aniline, pyrrole, furan, acetylene, or a derivative thereof other than EDT, as long as oxidation polymerization is carried out with a predetermined oxidizing agent to form a polymerizable monomer. Substances with the structural formula shown in FIG. 1 may be used for the thiophene derivative.

(C-7) Operation and Effect of the Second Embodiment

The reason that the ESR is reduced and an improvement in the electrostatic capacity and withstand voltage can be obtained with the configuration of the above-described second embodiment is that when PVA dissolved during chemical repair adheres to the dielectric film, additives are added thereafter, and PEDT is then formed, the adhesiveness of the PVA and PEDT is increased and the electrostatic capacity and ESR are improved.

Furthermore, PVA elutes from the separator during chemical repair and the voids in the separator increase in size, so more PEDT is retained in the separator and the ESR decreases. The attack of the PVA deposited on the dielectric film toward the dielectric film of oxidizing agent remaining in the PEDT is reduced and the withstand voltage is increased. If the PVA content is less than 10 wt %, these effects are reduced.

(C-8) Examples Related to the Second Embodiment

The invention of the second embodiment is described next on the basis of Examples and conventional examples manufactured in the manner described below.

EXAMPLE C1

PET fiber was used as the main fiber, and a solid electrolytic capacitor was fabricated as follows by using a separator containing 10 wt % of PVA as a binder. An electrode-forming device was connected to the cathode foil and the anode foil on whose surface an oxide film layer had been formed, and both electrode foils were wound with the interposed separator to form a capacitor element. The capacitor element was immersed for 40 minutes in ammonium dihydrogen phosphate, and chemical repair was carried out. After the chemical repair, the capacitor element was dried at 100° C., immersed for three minutes at normal temperature in an aqueous solution of 1 wt % acetylene diol, dried at 60° C., and heated at 170° C.

EDT and an ethanol solution of 45% ferric p-toluenesulfonate were mixed in a container, the capacitor element was immersed for 10 seconds in the mixed liquid and heated for 60 minutes at 120° C., and a PEDT polymerization reaction was induced in the capacitor element to form a solid electrolyte layer. The capacitor element was inserted into a cylindrical outer case with a closed end, and sealing rubber was mounted in the open-end portion and sealed with a tightening operation. Aging was thereafter carried out for 120 minutes at 150° C. with an applied voltage of 5.2 V to form a solid electrolytic capacitor. The rated voltage of the solid electrolytic capacitor was 4 WV, and the rated capacity was 180 µF.

EXAMPLE C2

Chemical repair was carried out, the capacitor element was then dried at 100° C., thereafter immersed for three minutes at normal temperature in an aqueous solution of 1 wt % dimethyl lauryl amine oxide, dried at 60° C., and heated at 170° C. Other conditions and steps were the same as Example C1.

COMPARATIVE EXAMPLE C1

Additives were not added to the capacitor element, but other conditions and steps were kept the same as Example C1 to fabricate a solid electrolytic capacitor.

[Comparison of the Results]

The initial characteristics of the Examples C1 and C2, and Comparative Example C1 carried out as described above were investigated and the results shown in Table 2 were obtained.

TABLE 2

| | | INITIAL CHARACTERISTICS | |
| --- | --- | --- | --- |
| | ADDITIVE | CAP (µF) | ESR (Ω/100 kHz) |
| EXAMPLE C1 | ACETYLENE DIOL | 80 | 18.5 |
| EXAMPLE C2 | DIMETHYL LAURYL AMINE OXIDE | 75 | 19.0 |
| COMPARATIVE EXAMPLE C1 | NOT USED | 71 | 20.5 |

It is apparent from Table 2 that Examples C1 and C2 exhibit a greater electrostatic capacity and a lower ESR than Comparative Example C1.

When a comparison was made of the use of a separator in which PVA was not included as a binder, the shorting voltage increased 20V.

(D) Third Embodiment

The present inventors, arrived at the following conclusions as a result of thoroughgoing research as to the cause of the higher ratio of shorting occurrences in the aging step when manufacturing a high withstand voltage product in order to achieve the third object. Specifically, in addition to an electroconductive polymer, also present in the capacitor after the electroconductive polymer has been formed are monomers and oxidizing agents unrelated to the polymerization reaction, and other reaction residues. The withstand voltage of the substances other than the electroconductive polymer is lower than the withstand voltage of the electroconductive polymer, so it is thought that these substances reduce the withstand voltage of the solid electrolytic capacitor.

In view of the above, the present inventors, as a result of thoroughgoing research to improve the withstand voltage of the solid electrolytic capacitor and to prevent degradation of the withstand voltage characteristics due to lead-free reflow in the presence of these reaction residues, found that the withstand voltage of the solid electrolytic capacitor can be improved by forming a capacitor element using a separator containing a compound with a vinyl group and adding a borate compound to the capacitor element.

(D-1) Method for Manufacturing the Solid Electrolytic Capacitor

The method for manufacturing the solid electrolytic capacitor in the third embodiment is described below. That is, a cathode foil and an anode foil, with an oxidized film layer formed on the surface and a separator containing a compound with a vinyl group interposed therebetween, are wound together to form a capacitor element, and the capacitor element is subjected to chemical repair. Next, a solution of a borate compound is impregnated and heated in the capacitor element, a conjugate composed of a compound with a vinyl group and a borate compound is generated, the capacitor element is thereafter immersed in a mixed liquid that was prepared by mixing a polymerizable monomer and an oxidizing agent together with a predetermined solvent, and a polymerization reaction involving the electroconductive polymer is induced in the capacitor element to form a solid electrolyte layer. The capacitor element is then inserted in an outer case; sealing rubber is mounted in the open-end portion and sealed with a tightening operation; and the unit is thereafter aged to form a solid electrolytic capacitor. It is even more advantageous to add a predetermined coupling agent to the capacitor element prior to impregnation with the polymerizable monomer and the oxidizing agent.

(D-2) Separator

A separator for a solid electrolytic capacitor principally composed of synthetic resin is ordinarily composed of a binder that joins the synthetic resin and other components together. The synthetic resin itself may be used as the binder, or the synthetic resin may be made into a fibrous form and melted in the separator fabrication process to form the main fiber. Adequate results were obtained in the present invention by using a separator in which a compound with a vinyl group is used as the main fiber or binder of such a separator.

The required amount of compound with a vinyl group that is added to the main fiber or binder of the separator may be a small amount, but the effect is not diminished with a larger amount. The reason for this is that the compound with a vinyl group that was added to the separator elutes and adheres to the oxide film layer, so the effect of the present invention can be obtained. Therefore, the separator may be formed with 100% vinylon fiber in the same manner as a vinylon separator. In this case, the elution amount should be controlled so that an excessive amount of compound with a vinyl group is not eluted in the manufacturing step, reducing the strength of the separator. A typical example of the present invention is a separator that uses a PVA binder, but in this case, the content thereof is preferably kept at 10 to 20 wt % in order to obtain a predetermined strength.

Examples of compounds with a vinyl group that are preferably used in this case are polyvinyl alcohol (hereinafter abbreviated as PVA), polyvinyl acetate, polyvinyl pyrrolidone, and polyacrylamide, but PVA is preferred. More specifically, PVA fiber (vinylon) or undrawn vinylon may be used as the main fiber of the separator, and a PVA polymer or undrawn vinylon may be used as the binder. Vinylon fiber with a fiber diameter of 3.0 to 12.0 µm is cut into short fibers with a predetermined cut length, and, using a predetermined binder, unwoven cloth obtained with any device may be used, for example.

Methods that may be used for adding a compound with a vinyl group to the separator include a method in which the separator is composed of the binder or main fiber as described above (that is to say, a method for adding the compound with a vinyl group as a constituent component of the separator), a method in which the separator is immersed in a solution of the compound with a vinyl group, and a method for applying the compound with a vinyl group.

(D-3) Borate Compound

Examples of borate compounds that may be used include boric acid, borax, ammonium salt of boric acid, metal salt or another metal salt, and triethyl borate or another ester of boric acid, but boric acid is preferred.

The solvent for these borate compounds should be one in which these compounds are dissolved, and mainly water, glycerin, or the like can be used. The concentration of the borate compound solution is preferably 0.1 wt % to 10 wt %, and is more preferably 3 wt % to 7 wt %. When the concentration of the borate compound solution is not in this range, the effect is reduced. This is due to the fact that when the concentration of borate compound solution is less than 0.1 wt %, the amount of conjugate formed is insufficient because the amount of borate compound in the solution is small. Although the reason is not apparent, when the concentration of borate compound solution is greater than 10 wt %, the excess boric acid exerts a negative effect after the conjugate is formed, and the ESR increases.

(D-4) Method for Adding the Borate Compound to the Capacitor Element

A method of immersing a capacitor element in the borate compound solution, or a method for discharging the borate compound solution over the capacitor element may be used for adding the borate compound to the capacitor element.

It was found that when the borate compound is added to the capacitor element and heating treatment is performed thereafter, the initial characteristics improve. It is thought that the reason for this is that the compound with a vinyl group contained in the separator elutes into the capacitor element and the hydrophobicity of the end groups thereof increases, so the adhesiveness of the oxide film and the solid electrolyte improves. The heating temperature is preferably 120 to 250° C., and is more preferably 150 to 200° C. When the heating temperature is not in this range, the effect is reduced. This is thought to be due to the fact that when the heating temperature is less than 120° C., reactions such as the one that increases the hydrophobicity of the end groups of the compound with a vinyl group do not adequately progress, and when the heating temperature exceeds 250° C., the thermal degradation of the compound with a vinyl group takes place and the effect is reduced.

(D-5) Timing for Adding the Borate Compound in the Capacitor Element

The present inventors thoroughly researched the timing for adding the borate compound to the capacitor element. As a result, it became apparent that the addition may be made at a stage prior to the step for forming an electroconductive polymer, or at any other stage. In other words, the timing may be prior to chemical repair, as described above, or the compound may be allowed to deposit on the electrode foils prior to forming the capacitor element, and the methods (1) to (3) described below, for example, may be considered. The method in (1) corresponds to the manufacturing method described in (D-1).

The most advantageous of the methods (1) to (3) described below is method (1), in which an anode foil and cathode foil are wound while a separator to which a compound with a vinyl group has been added is interposed therebetween to form a capacitor element, the capacitor element is subjected to chemical repair, the capacitor element is then impregnated with a solution of borate compound, a conjugate composed of a borate compound and a compound with a vinyl group is formed, and a polymerization reaction involving the electroconductive polymer is thereafter induced in the capacitor element to form a solid electrolyte layer. The effect of the present invention is not changed if the resin sealing is not performed with the methods described below.

Figure 2:
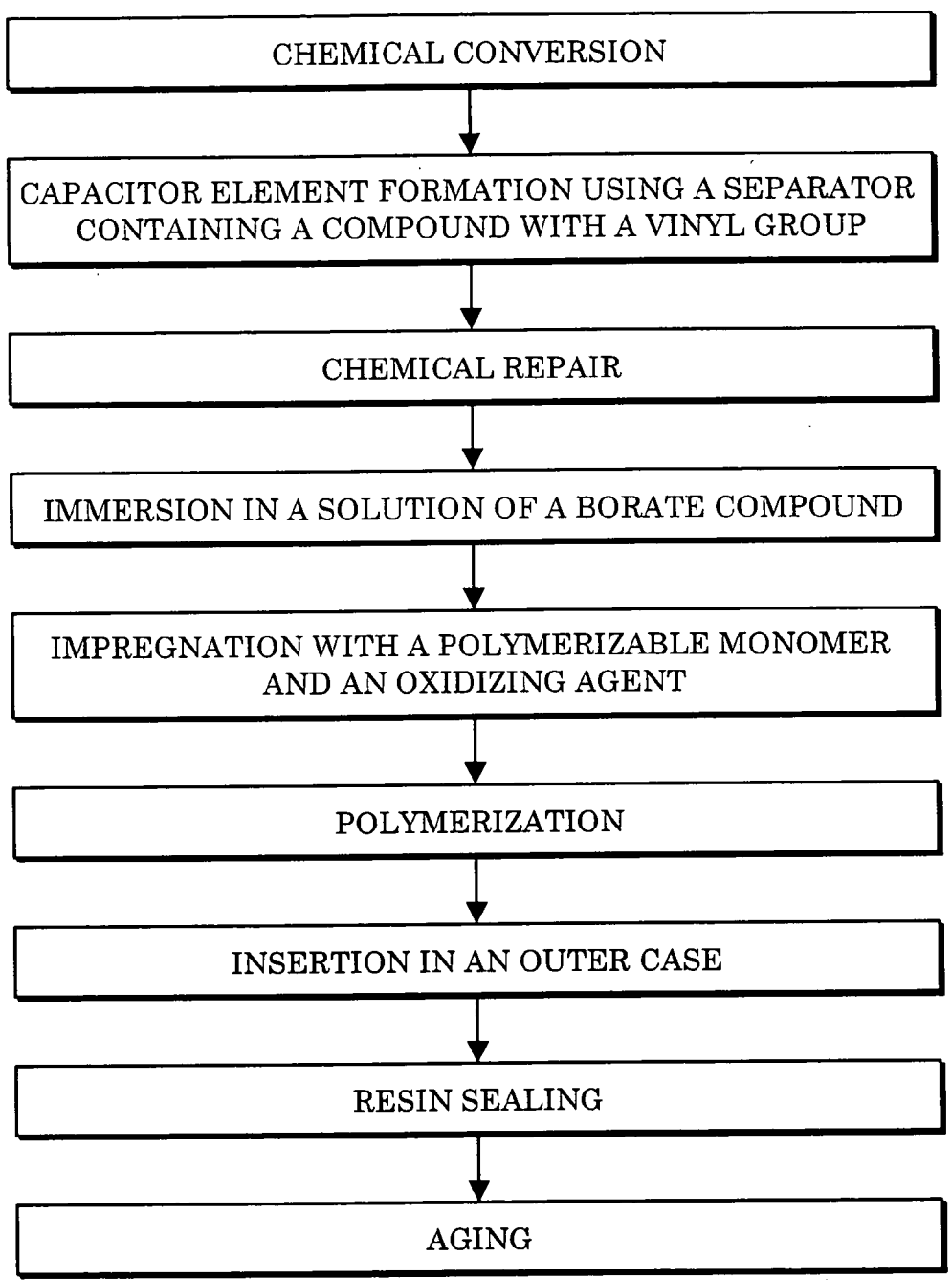
FIGS. 2 to 4 are flowcharts showing examples of the manufacturing step for a solid electrolytic capacitor related to the present invention.

(1) After Chemical Repair . . . Refer to FIG. 2

This method is carried out in the following order: chemical conversion, capacitor element formation using a separator containing a compound with a vinyl group, chemical repair, immersion in a solution of a borate compound, impregnation with a polymerizable monomer and an oxidizing agent, polymerization, insertion in but an outer case, resin sealing, and aging.

Figure 3:
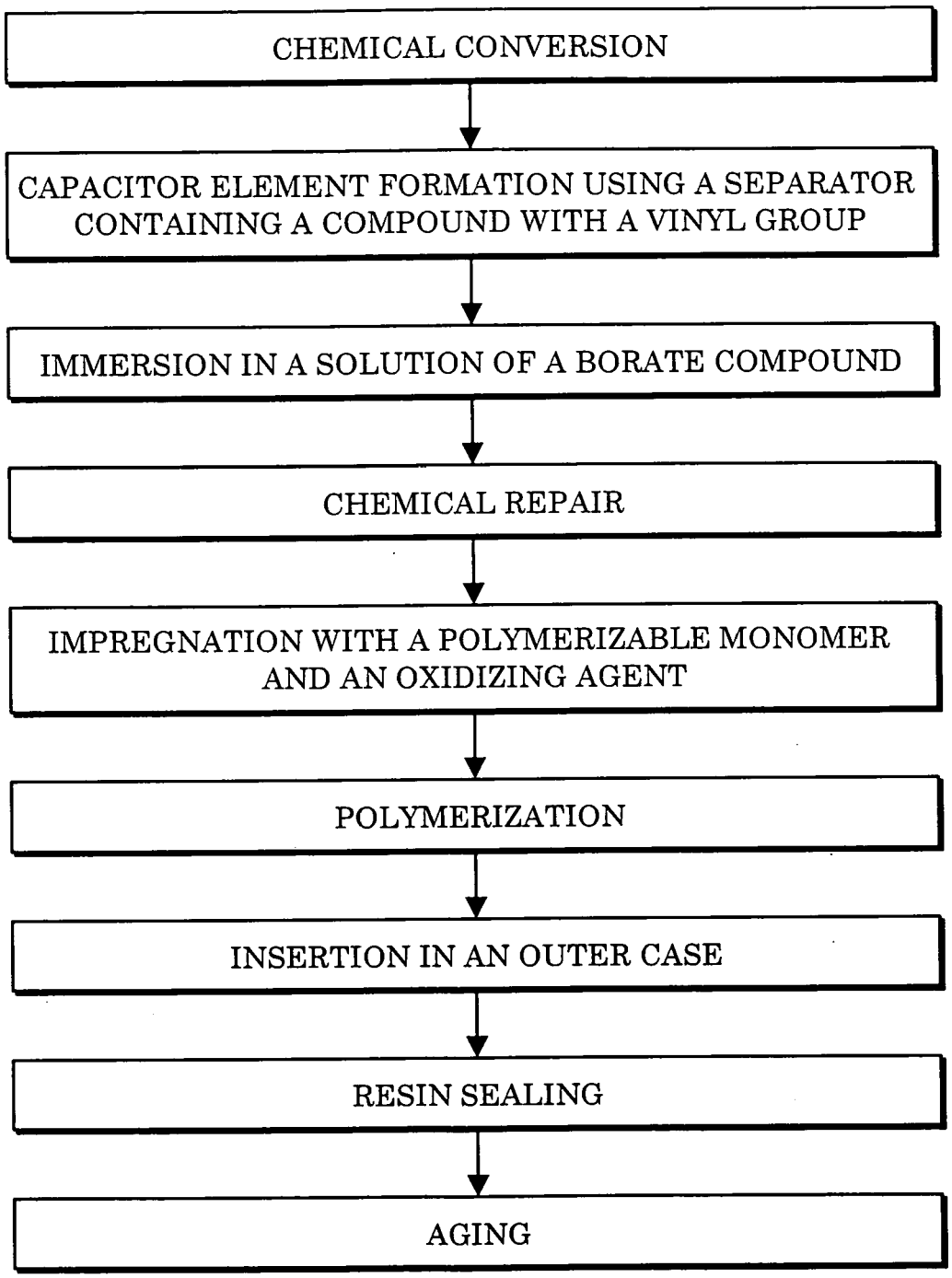

(2) After Capacitor Element Formation, But Prior to Chemical Repair . . . Refer to FIG. 3

This method is carried out in the following order: chemical conversion, capacitor element formation using a separator containing a compound with a vinyl group, immersion in a solution of a borate compound, chemical repair, impregnation with a polymerizable monomer and an oxidizing agent, polymerization, insertion in an outer case, resin sealing, and aging.

Figure 4:
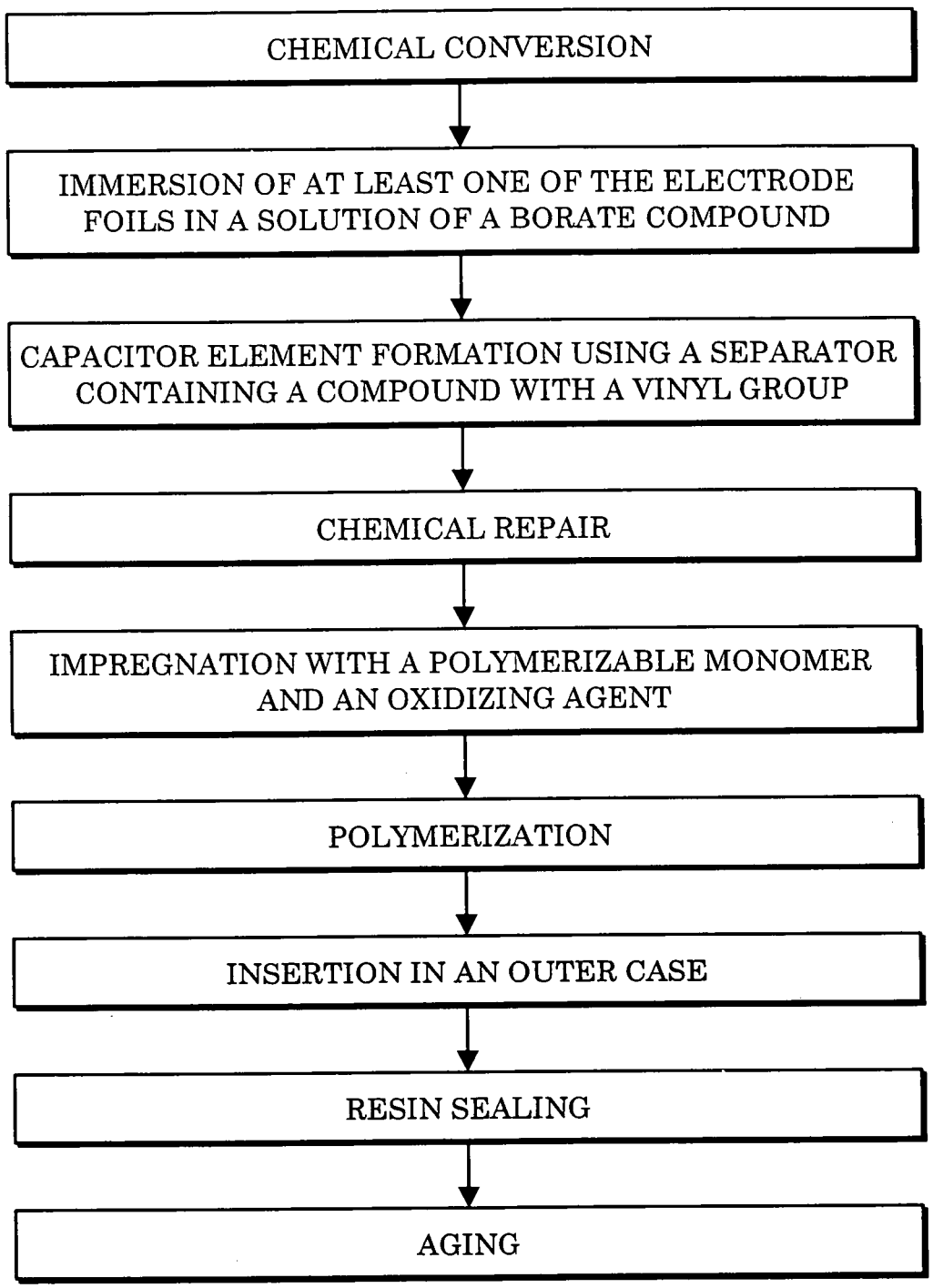
Figure 5:
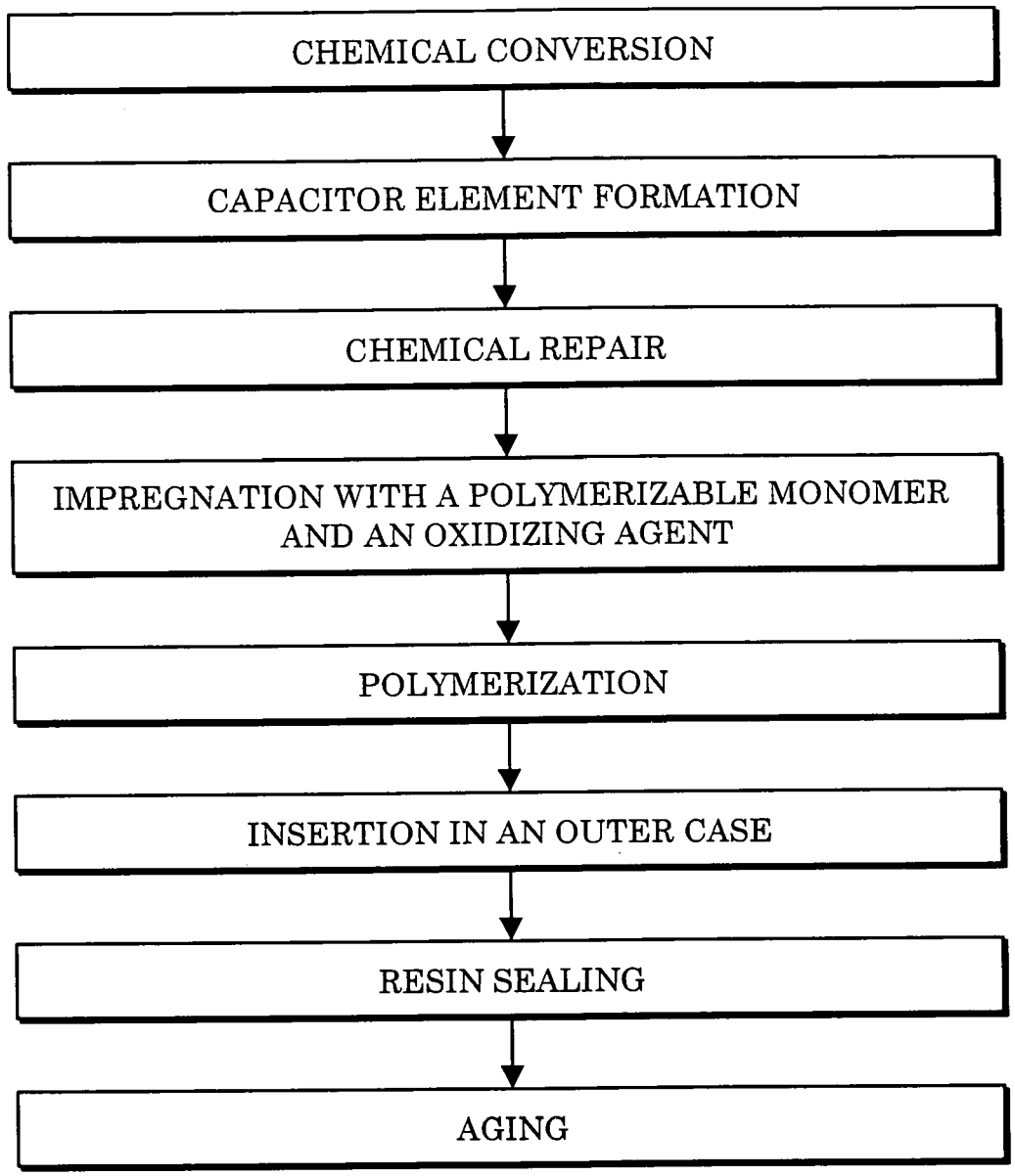
FIG. 5 is a flowchart showing an example of the manufacturing step for a solid electrolytic capacitor using conventional technology.

(3) Prior to Capacitor Element Formation . . . Refer to FIG. 4

This method is carried out in the following order: chemical conversion, immersion of at least one of the electrode foils in a solution of a borate compound (or application and drying thereafter), capacitor element formation using a separator containing a compound with a vinyl group, chemical repair, impregnation with a polymerizable monomer and an oxidizing agent, polymerization, insertion in an outer case, resin sealing, and aging.

The concentration of the solution of a borate compound, temperature, impregnation time, drying temperature, drying time, and other parameters in these methods are the same as described above.

(D-6) Coupling Agent

The following silane coupling agents, titanium coupling agents, and aluminum coupling agents may be used for the coupling agent, and one, or two or more coupling agents selected from among these may be used.

Methods that entail performing chemical repair, then immersing the capacitor element for several minutes in an aqueous solution of a coupling agent with a concentration of 0.1 to 5%, and more preferably 0.5 to 3%, removing the capacitor element from the solution, and thereafter drying the capacitor element at 50 to 100° C. may be used for adding these coupling agents to the capacitor element.

Examples of silane coupling agents include:
vinyl trichlorosilane,
vinyl(β-methoxysilane) vinyl triethoxysilane,
vinyl trimethoxysilane,
vinyl tris(β-methoxyethoxy)silane,
γ-methacryloxysilane,
γ-methacryloxypropyl methyl dimethoxy silane,
γ-methacryloxypropyl trimethoxysilane,
β-(3,4-epoxycyclohexyl)ethyl trimethoxysilane,
γ-glycidoxypropyl trimethoxysilane,
γ-glycidoxypropyl methyl diethoxysilane,
N-β-(aminoethyl)-γ-aminopropyl methoxysilane,
γ-aminopropyl triethoxysilane,
N-phenyl-γ-aminopropyl methoxysilane,
γ-mercaptopropyl methoxysilane, and
γ-chloropropyl methoxysilane.

Examples of titanium coupling agents include:
isopropyl triisostearoyl titanate,
isopropyl tris(dioctyl pyrophosphite) titanate,
isopropyl tri(N-aminoethyl-aminoethyl)titanate,
isopropyl tridecyl benzene sulfonyl titanate,
tetraoctyl bis(ditridecyl phosphite)titanate,
tetra(2,2-diaryloxymethyl-1-butyl)-bis(di-tridecyl)phosphite titanate,
bis(dioctyl pyrophosphate)oxyacetate titanate,
bis(dioctyl pyrophosphate)ethylene titanate,
isopropyl trioctanoyl titanate,
isopropyl dimethacryl isostearoyl titanate, and
isopropyl tricumyl phenyl titanate.

An example of the aluminum coupling agent is an acetal alkoxy aluminum diisopropylate.

(D-7) EDT and Oxidizing Agent

When EDT is used as the polymerizable monomer, an EDT monomer can be used as the EDT with which the capacitor element is impregnated, but a monomer solution in which EDT and a volatile solvent are mixed at a volume ratio of 1:0 to 1:3 may also be used.

Pentane or another hydrocarbon, tetrahydrofuran or another ether, ethyl formate or another ester, acetone or another ketone, methanol or another alcohol, or acetonitrile or another nitrogen compound may be used as the volatile solvent, but preferably used among these is methanol, ethanol, acetone, or the like.

Ferric p-toluenesulfonate dissolved in ethanol, or an aqueous solution of periodic acid or iodic acid can be used as the oxidizing agent, but the concentration of the oxidizing agent with respect to the solvent is preferably 40 to 57 wt %, and is more preferably 45 to 57 wt %. The ESR decreases with increased concentration of the oxidizing agent with respect to the solvent. A volatile solvent used for the above-described monomer solutions may be used as the solvent for the oxidizing agent, and among these ethanol is advantageous. The reason that ethanol is advantageous as the solvent for the oxidizing agent is believed to be that the vapor pressure is low, so evaporation easily occurs, and the remaining amount is small.

(D-8) Reduced Pressure

It is even more preferable to reduce the pressure in the polymerization step. The reason for this is that when the pressure is reduced during heat polymerization, residual matter can be evaporated away together with polymerization. The pressure is preferably reduced to about 10 to 360 mmHg.

(D-9) Impregnation Step

The time for impregnating the capacitor element with the mixed liquid is determined by the size of the capacitor element, but 5 seconds or more is preferred for a capacitor element with a size of about φ5×3 L, and 10 seconds or more is preferred for a capacitor element with a size of about φ9×5 L. Impregnation for 5 seconds is required at minimum. There are no drawbacks to the characteristics even if impregnation is carried out over a long period of time.

It is advantageous to keep the pressure reduced after impregnation has been performed in this manner. It is thought that the reason for this is that the residual amount of volatile solvent is reduced. The reduced pressure conditions are the same as the reduced pressure conditions in the above-described polymerization step.

(D-10) Chemical Conversion Solution for Chemical Repair

Ammonium dihydrogen phosphate, diammonium hydrogen phosphate, or another phosphate-based chemical conversion solution; ammonium borate or another boric acid-based chemical conversion solution; or ammonium adipate or another adipic acid-based chemical conversion solution may be used as the chemical conversion solution for chemical repair, but preferably used among these is ammonium dihydrogen phosphate. The immersion time is preferably 5 to 120 minutes.

(D-11) Other Polymerizable Monomers

The polymerizable monomer used in the present invention may be, in addition to the above-described EDT, a thiophene derivative, aniline, pyrrole, furan, acetylene, or a derivative thereof other than EDT, as long as oxidation polymerization is carried out with a predetermined oxidizing agent to form a polymerizable monomer. Substances with the structural formula shown in FIG. 1 may be used for the thiophene derivative.

(D-12) Operation and Effect of the Third Embodiment

As described above, degradation of the withstand voltage characteristics due to lead-free reflow can be prevented, and the ratio of shorting occurrence in the aging step can be considerably reduced by forming a capacitor element using a separator containing a compound with a vinyl group, and adding a borate compound to the capacitor element at a predetermined time.

It is thought that the reason that such effects can be obtained is that by allowing the compound with a vinyl group contained in the separator to elute into the capacitor element to form a conjugate with a borate compound or another hydrogen bond in the capacitor element, and allowing this conjugate to deposit on the oxide film of the electrode foils to form a layer, the adhesiveness of the oxide film and the solid electrolyte improves, and because the withstand voltage of this layer is high, the withstand voltage of the capacitor is also improved.

Allowing the compound with a vinyl group added to the separator to elute as in the present invention is more advantageous than adding a compound with a vinyl group to the element after formation of the capacitor element in that the conjugate with borate compound uniformly deposits on the oxide film.

In particular, it is thought that when PVA and boric acid are used, a conjugate composed of an ester compound is formed, and this ester compound deposits on the surface of the film to form an adequate layer without immersion in a dielectric film, so adequate characteristics can be obtained.

As described above, it is thought that when heating treatment is carried but after adding the borate compound, the bonding characteristics of the end group of the compound with a vinyl group eluted from the separator with respect to the dielectric oxide layer and the electroconductive polymer are improved, and the initial characteristics, and the electrostatic capacity and ESR characteristics in particular, are enhanced.

Also, when a coupling agent is added to the capacitor element in the third embodiment, adhesion to PEDT is further enhanced by the synergistic effect with the conjugate, and the electrostatic capacity and ESR are improved.

When the PVA content is less than 10 wt %, these effects are reduced.

(D-13) Examples Related to the Third Embodiment

The invention of the third embodiment is described next on the basis of Examples, Comparative Examples, and conventional examples manufactured in the manner described below.

EXAMPLE D1

A solid electrolytic capacitor was fabricated as follows by using a separator containing a PVA polymer as a binder and containing 49 wt % of PET fiber as the main fiber. An electrode-forming device was connected to the cathode foil and the anode foil on whose surface an oxide film layer had been formed, and both electrode foils were wound with the interposed separator to form a capacitor element whose element shape was 5φ×2.8 L. The capacitor element was immersed for 40 minutes in ammonium dihydrogen phosphate, and chemical repair was carried out. After the chemical repair, the capacitor element was dried at 100° C., immersed for three minutes at normal temperature in an aqueous solution of 5 wt % boric acid, and heated at 175° C.

EDT and an ethanol solution of 45% ferric p-toluenesulfonate were mixed in a container, and the capacitor element was immersed for 10 seconds in the mixed liquid, held in a state of reduced pressure of about 250 mmHg, and subsequently heated for 60 minutes at 120° C. under the same conditions. A PEDT polymerization reaction was induced in the capacitor element to form a solid electrolyte layer.

The capacitor element was inserted into a cylindrical outer case with a closed end, and sealing rubber was mounted in the open-end portion and sealed with a tightening operation. Aging was thereafter carried out for 120 minutes at 150° C. with an applied voltage of 33 V to form a solid electrolytic capacitor. The rated voltage of the solid electrolytic capacitor was 25 WV, and the rated capacity was 15 µF.

EXAMPLE D2

PET fiber was used as the main fiber, and a solid electrolytic capacitor was fabricated as follows using a separator containing 10 wt % of PVA as a binder. An electrode-forming device was connected to the cathode foil and the anode foil on whose surface an oxide film layer had been formed, and both electrode foils were wound with the interposed separator to form a capacitor element. The capacitor element was immersed for 40 minutes in ammonium dihydrogen phosphate, and chemical repair was carried out. After the chemical repair, the capacitor element was dried at 100° C., then immersed for several minutes at normal temperature in an aqueous solution of 5 wt % boric acid, and dried for one hour at 150° C. The capacitor element was also immersed for one minute at normal temperature in an aqueous solution of 1 wt % N-β(aminoethyl) γ-aminopropyl methoxy silane, and dried for one hour at 80° C.

EDT and an ethanol solution of 45% ferric p-toluenesulfonate were mixed in a container, the capacitor element was immersed for 10 seconds in the mixed liquid and heated for 60 minutes at 120° C., and a PEDT polymerization reaction was induced in the capacitor element to form a solid electrolyte layer. The capacitor element was inserted into a cylindrical outer case with a closed end, and sealing rubber was mounted in the open-end portion and sealed with a tightening operation. Aging was thereafter carried out for 120 minutes at 150° C. with an applied voltage of 5.2 V to form a solid electrolytic capacitor. The rated voltage of the solid electrolytic capacitor was 2.5 WV, and the rated capacity was 180° F.

COMPARATIVE EXAMPLE D1

After chemical repair, an electroconductive polymer was formed without immersing the capacitor element in an aqueous solution of boric acid. Other conditions and steps were the same as Example D1.

COMPARATIVE EXAMPLE D2

A separator containing 49 wt % of PET fiber as the main fiber was used and a PET polymer was used as a binder. Other conditions and steps were the same as Example D1.

COMPARATIVE EXAMPLE D3

After chemical repair, the capacitor element was immersed in aqueous solution of 5 wt % boric acid, and heating treatment was not performed. Other conditions and steps were the same as Example D1.

COMPARATIVE EXAMPLE B1

The capacitor element was not immersed in an aqueous solution of boric acid or in a coupling agent, but other conditions and steps were the same as Example D2.

[Comparison of the Results]

The initial characteristics and the number of occurrences of shorting for 50 solid electrolytic capacitors in the working and Comparative Examples obtained with the method described above were investigated and the results shown in Table 3 were obtained. The non-defective units in which shorting did not occur were subjected to lead-free re-flowing at a peak temperature of 250° C. and held for 30 seconds at no less than 230° C. A surge test was thereafter performed such that charging and discharging were carried out at 32.5 V in the course of 1,000 cycles at a temperature of 125° C. When the shorting voltage was measured, the results shown in Table 3 were obtained.

When the initial characteristics of Example D2 and Comparative Example D4 obtained with the above-described method were investigated, the results shown in Table 4 were obtained.

TABLE 3

|  | INITIAL CHARACTER- ISTICS | | NUMBER OF OCCURRENCES OF SHORTING AFTER AGING | SHORTING VOLTAGE AFTER SURGE TEST (V) |
|---|---|---|---|---|
|  | CAP (µF) | ESR (Ω/100 kHz) | | |
| EXAMPLE D1 | 15.3 | 0.045 | 0 | 52.5 |
| COMPARATIVE EXAMPLE D1 | 15.0 | 0.050 | 6 | 51.0 |
| COMPARATIVE EXAMPLE D2 | 14.2 | 0.055 | 7 | 51.0 |
| COMPARATIVE EXAMPLE D3 | 15.1 | 0.047 | 4 | 51.2 |

It is apparent from Table 3 that in Example D1, in which a separator containing PVA polymer was used and an aqueous solution of boric acid was added to the capacitor element, the initial characteristics, the number of occurrences of shorting after the aging step, and the shorting voltage after a surge were all superior in comparison with the Comparative Examples D1 to D3.

In contrast, the initial characteristics of Comparative Example D1, in which the boric acid treatment was not performed, and Comparative Example D2, in which a separator that did not contain a compound with a vinyl group, were poor in comparison with Example D1. Comparative Example D3, in which heating treatment was not performed, exhibited better results than Comparative Examples D1 or D2, but the results were inferior in comparison with Example D1.

TABLE 4

|  | IMMERSION IN BORIC ACID | IMMERSION IN SILANE COUPLING AGENT | INITIAL CHARACTER- ISTICS | |
|---|---|---|---|---|
|  |  |  | CAP (µF) | ESR (Ω/100 kHz) |
| EXAMPLE D2 | IMMERSED | IMMERSED | 152 | 0.021 |
| COMPARATIVE EXAMPLE D4 | NOT IMMERSED | NOT IMMERSED | 132 | 0.023 |

When Example D2, in which the capacitor element was immersed in a coupling agent, and Comparative Example D4, in which a coupling agent was not used to impregnate the capacitor element, are examined in Table 4, it is apparent that, in comparison with Comparative Example D4, the electrostatic capacity increased by 1.15 times and the ESR was reduced by about 91% in Example D2 in which a coupling agent was added.

The shorting voltage increased 20 V when compared with the case in which a separator that does not contain PVA as a binder is used.

(E) Fourth Embodiment

The present embodiment is a modified example of the third embodiment described above. A capacitor element is formed using a separator containing a compound with a vinyl group, and the additive that is added to the capacitor element is dodecylbenzenesulfonic acid (DBS). It was found in this case as well that the same operation and effects as the third embodiment can be obtained.

(E-1) Method for Manufacturing the Solid Electrolytic Capacitor

The method for manufacturing the solid electrolytic capacitor in the fourth embodiment is described below. That is, a cathode foil and an anode foil, with an oxidized film layer formed on the surface and a separator containing a compound with a vinyl group interposed therebetween, are wound together to form a capacitor element, and the capacitor element is subjected to chemical repair. Next, a solution of dodecylbenzenesulfonic acid is impregnated in the capacitor element, a conjugate composed of a compound with a vinyl group and dodecylbenzenesulfonic acid is formed, the capacitor element is thereafter immersed in a mixed liquid that was prepared by mixing a polymerizable monomer and an oxidizing agent together with a predetermined solvent, and a polymerization reaction involving the electroconductive polymer is induced in the capacitor element to form a solid electrolyte layer. The capacitor element is then inserted in an outer case; sealing rubber is mounted in the open-end portion and sealed with a tightening operation; and the unit is thereafter aged to form a solid electrolytic capacitor.

(E-2) Separator

The separator used in the present embodiment is preferably the same separator that is described in the section titled "(D-2) Separator" of the third embodiment.

(E-3) Dodecylbenzenesulfonic Acid (DBS)

Water, alcohol, or the like is preferably used as the solvent for the dodecylbenzenesulfonic acid used in the present invention. The concentration of the dodecylbenzene-sulfonic acid is preferably 0.1 wt % to 5 wt %, and even more preferably 0.2 wt % to 2 wt %. When the concentration of the dodecylbenzenesulfonic acid solution is not in this range, the layer of the conjugate of DBS and PVA is thin, so the electrostatic capacity, improvement in the ESR characteristics, improvement in the withstand voltage, and LC suppression effect are all diminished. When the concentration of the dodecylbenzenesulfonic acid solution exceeds this range, the layer of the conjugate of DBS and PVA is excessively thick, and the electroconductive characteristics of the layer are reduced, so the electrostatic capacity and the ESR characteristics are also diminished.

(E-4) Method for Adding DBS to the Capacity Element

A method of immersing a capacitor element in the dodecylbenzenesulfonic acid solution, or a method of discharging the dodecylbenzenesulfonic acid solution over the capacitor element may be used for adding the dodecylbenzene-sulfonic acid to the capacitor element.

It was found that when dodecylbenzenesulfonic acid is added to the capacitor element and heating treatment is performed thereafter, the initial characteristics improve. It is thought that the reason for this is that the compound with a vinyl group contained in the separator elutes into the capacitor element and the hydrophobicity of the end groups thereof increases, so the adhesiveness of the oxide film and the solid electrolyte improves. The heating temperature is preferably 120 to 250° C., and is more preferably 150 to 200° C. When the heating temperature is not in this range, the effect is reduced. This is thought to be due to the fact that when the heating temperature is less than 120° C., the reaction that increases the hydrophobicity of the end groups of the compound with a vinyl group does not adequately progress, and when the heating temperature exceeds 250° C., the thermal degradation of the compound with a vinyl group takes place and the effect is reduced.

(E-5) Timing for Adding DBS to the Capacity Element

The present inventors thoroughly researched the timing for adding the dodecylbenzenesulfonic acid to the capacitor element, and, as a result, it became apparent that the addition may be made at a stage prior to the step for forming an electroconductive polymer, in the same manner as the third embodiment, or at any other stage. In other words, the timing may be prior to chemical repair, as described above, or the compound may be allowed to deposit on the electrode foils prior to forming the capacitor element, and the methods (1) to (3) described below, for example, may be considered. The method in (1) corresponds to the manufacturing method described above.

The most advantageous of the methods (1) to (3) described below is method (1), in which an anode foil and cathode foil are wound while a separator to which a compound with a vinyl group has been added is interposed therebetween to form a capacitor element, the capacitor element is subjected to chemical repair, the capacitor element is then impregnated with a solution of dodecylbenzenesulfonic acid, a conjugate composed of dodecylbenzenesulfonic acid and a compound with a vinyl group is formed, and the polymerization reaction of the electroconductive polymer is thereafter brought about in the capacitor element to form a solid electrolyte layer.

Application of the methods described below may be made by substituting a solution of dodecylbenzenesulfonic acid for the solution of the borate compound of FIGS. 2 to 4 shown in the third embodiment.

(1) After Chemical Repair . . . Refer to FIG. 2

This method is carried out in the following order: chemical conversion, capacitor element formation using a separator containing a compound with a vinyl group, chemical repair, immersion in a solution of dodecylbenzenesulfonic acid, impregnation with a polymerizable monomer and an oxidizing agent, polymerization, insertion in an outer case, resin sealing, and aging.

(2) After Capacitor Element Formation, But Prior to Chemical Repair . . . Refer to FIG. 3

This method is carried out in the following order: chemical conversion, capacitor element formation using a separator containing a compound with a vinyl group, immersion in a solution of dodecylbenzenesulfonic acid, chemical repair, impregnation with a polymerizable monomer and an oxidizing agent, polymerization, insertion in an outer case, resin sealing, and aging.

(3) Prior to Capacitor Element Formation . . . Refer to FIG. 4

This method is carried out in the following order: chemical conversion, immersion of at least one of the electrode foils in a solution of dodecylbenzenesulfonic acid (or application and drying thereafter), capacitor element formation using a separator containing a compound with a vinyl group, chemical repair, impregnation with a polymerizable monomer and an oxidizing agent, polymerization, insertion in an outer case, resin sealing, and aging.

The concentration of the solution of dodecylbenzenesulfonic acid, temperature, impregnation time, drying temperature, drying time, and other parameters in these methods are the same as described above.

(E-6) EDT and Oxidizing Agent

When EDT is used as the polymerizable monomer, an EDT monomer can be used as the EDT with which the capacitor element is impregnated, but a monomer solution in which EDT and a volatile solvent are mixed at a volume ratio of 1:0 to 1:3 may also be used.

Pentane or another hydrocarbon, tetrahydrofuran or another ether, ethyl formate or another ester, acetone or another ketone, methanol or another alcohol, or acetonitrile or another nitrogen compound may be used as the volatile solvent, but preferably used among these is methanol, ethanol, acetone, or the like.

Ferric p-toluenesulfonate dissolved in ethanol, or an aqueous solution of periodic acid or iodic acid can be used as the oxidizing agent, but the concentration of the oxidizing agent with respect to the solvent is preferably 40 to 57 wt %, and is more preferably 45 to 57 wt %. The ESR decreases with increased concentration of the oxidizing agent with respect to the solvent. A volatile solvent used for the above-described monomer solutions may be used as the solvent for the oxidizing agent, and among these ethanol is advantageous. The reason that ethanol is advantageous as the solvent for the oxidizing agent is believed to be that the vapor pressure is low, so evaporation easily occurs, and the remaining amount is small.

(E-7) Reduced Pressure

It is even more preferable to reduce the pressure in the polymerization step. The reason for this is that when the pressure is reduced during heat polymerization, residual matter can be evaporated away together with polymerization. The pressure is preferably reduced to about 10 to 360 mmHg.

(E-8) Impregnation Step

The time for impregnating the capacitor element with the mixed liquid is determined by the size of the capacitor element, but 5 seconds or more is preferred for a capacitor element with a size of about $\phi 5 \times 3$ L, and 10 seconds or more is preferred for a capacitor element with a size of about $\phi 9 \times 5$ L. Impregnation for 5 seconds is required at minimum. There are no drawbacks to the characteristics even if impregnation is carried out over a long period of time.

It is advantageous to keep the pressure reduced after impregnation has been performed in this manner. It is thought that the reason for this is that the residual amount of volatile solvent is reduced. The reduced pressure conditions are the same as the reduced pressure conditions in the above-described polymerization step.

(E-9) Chemical Conversion Solution for Chemical Repair

Ammonium dihydrogen phosphate, diammonium hydrogen phosphate, or another phosphate-based chemical conversion solution; ammonium borate or another boric acid-based chemical conversion solution; or ammonium adipate or another adipic acid-based chemical conversion solution may be used as the chemical conversion solution for chemical repair, but preferably used among these is ammonium dihydrogen phosphate. The immersion time is preferably 5 to 120 minutes.

(E-10) Other Polymerizable Monomers

The polymerizable monomer used in the present invention may be, in addition to the above-described EDT, a thiophene derivative, aniline, pyrrole, furan, acetylene, or a derivative thereof other than EDT, as long as oxidation polymerization is carried out with a predetermined oxidizing agent to form a polymerizable monomer. Substances with the structural formula shown in FIG. 1 may be used for the thiophene derivative.

(E-11) Operation and Effect of the Fourth Embodiment

As described above, degradation of the withstand voltage characteristics due to lead-free reflow can be prevented, and the ratio of shorting occurrence in the aging step can be considerably reduced by forming a capacitor element using a separator containing a compound with a vinyl group, and adding dodecylbenzenesulfonic acid to the capacitor element at a predetermined time.

It is thought that the reason that such effects can be obtained is that by allowing the compound with a vinyl group contained in the separator to elute into the capacitor element to form a conjugate with dodecylbenzenesulfonic acid or another hydrogen bond in the capacitor element, and allowing this conjugate to deposit on the oxide film of the electrode foils to form a layer, the adhesiveness of the oxide film and the solid electrolyte improves, and because the withstand voltage of this layer is high, the withstand voltage of the capacitor is also improved.

Allowing the compound with a vinyl group added to the separator to elute as in the present invention is more advantageous than adding a compound with a vinyl group to the element after formation of the capacitor element in that the conjugate with dodecylbenzenesulfonic acid uniformly deposits on the oxide film.

In particular, it is thought that when PVA and dodecylbenzenesulfonic acid are used, a conjugate composed of an ester compound is formed, and this ester compound deposits on the surface of the film without immersion in a dielectric film, so adequate characteristics can be obtained because an electron-blocking film is formed.

As described above, it is thought that when heating treatment is carried out after adding dodecylbenzenesulfonic acid, the bonding characteristics of the end group of the compound with a vinyl group eluted from the separator with respect to the dielectric oxide layer and the electroconductive polymer are improved, the initial characteristics, and the electrostatic capacity and ESR characteristics in particular, are enhanced, the withstand voltage is improved, and the LC is reduced.

(E-12) Examples Related to the Fourth Embodiment . . . . Part 1

The invention of the fourth embodiment is described next on the basis of Examples E1 to E4 and Comparative Example E1 manufactured in the manner described below.

EXAMPLE E1

A solid electrolytic capacitor was fabricated as follows by using a separator containing a PVA polymer as a binder and containing 49 wt % of PET fiber as the main fiber. An electrode-forming device was connected to the cathode foil and the anode foil on whose surface an oxide film layer had been formed, and both electrode foils were wound with the interposed separator to form a capacitor element whose element shape was $7\phi \times 5$ L. The capacitor element was immersed for 40 minutes in ammonium dihydrogen phosphate, and chemical repair was carried out. After the chemical repair, the capacitor element was dried at 100° C., immersed in an aqueous solution of 0.1 wt % dodecylbenzenesulfonic acid, and heated at 150° C.

EDT and an ethanol solution of 45% ferric p-toluenesulfonate were mixed in a container, and the capacitor element was immersed for 10 seconds in the mixed liquid, held in a state of reduced pressure of about 250 mmHg, and subsequently heated for 60 minutes at 120° C. under the same conditions. A PEDT polymerization reaction was induced in the capacitor element to form a solid electrolyte layer.

The capacitor element was inserted into a cylindrical outer case with a closed end, and sealing rubber was mounted in the open-end portion and sealed with a tightening operation. Aging was thereafter carried out for 120 minutes at 150° C. with an applied voltage of 33 V to form a solid electrolytic capacitor. The rated voltage of the solid electrolytic capacitor was 25 WV, and the rated capacity was 22 µF.

EXAMPLE E2

The concentration of the dodecylbenzenesulfonic acid solution was 0.5 wt %. A solid electrolytic capacitor was fabricated with the other parameters the same as Example E1.

EXAMPLE E3

The concentration of the dodecylbenzenesulfonic acid solution was 2.0 wt %. A solid electrolytic capacitor was fabricated with the other parameters the same as Example E1.

EXAMPLE E4

The concentration of the dodecylbenzenesulfonic acid solution was 5.0 wt %. A solid electrolytic capacitor was fabricated with the other parameters the same as Example E1.

COMPARATIVE EXAMPLE E1

Chemical repair was carried out without immersion in a solution of dodecylbenzenesulfonic acid to form an electro-conductive polymer. Other conditions and steps were the same as Example E1.

[Comparison of the Results]

When the initial characteristics and the reflow characteristics of the solid electrolytic capacitors of Examples E1 to E4 and Comparative Example E1 obtained with the above-described method were investigated, the results shown in Table 5 were obtained. The reflow test was carried out by subjecting the capacitors to lead-free re-flowing at a peak temperature of 250° C. and keeping the capacitors for 30 seconds at no less than 230° C., and the leakage current was calculated.

TABLE 5

| | DBS CONCEN-TRATION (%) | INITIAL CHARACTERISTICS | | REFLOW CHARACTER-ISTIC |
| --- | --- | --- | --- | --- |
| | | WITHSTAND VOLTAGE (V) | LC (µA) | LC (µA) |
| EXAMPLE E1 | 0.1 | 58 | 0.3 | 20 |
| EXAMPLE E2 | 0.5 | 59 | 0.7 | 9 |
| EXAMPLE E3 | 2.0 | 58 | 1.0 | 20 |
| EXAMPLE E4 | 5.0 | 55 | 1.5 | 20 |
| COMPARATIVE EXAMPLE E1 | 0 | 54 | 2.0 | 30 |

It is apparent from Table 5 that in Examples E1 to E4, in which a separator containing PVA polymer was used and a dodecylbenzenesulfonic acid solution was added to the capacitor element, the withstand voltage was 55 to 59 V, each resulting in an improvement in comparison with the Comparative Example E1 (54 V). In particular, in the Examples E1 to E3, in which the DBS concentration was 0.1 to 2.0%, the withstand voltage exhibited a high value of 58 to 59 V.

The initial and after-reflow leakage currents decreased to 0.3 to 1.5 µA and 9 to 20 µA, respectively, while those for Comparative Example E1 were 2 µA and 30 µA.

(E-13) Examples Related to the Fourth Embodiment . . . . Part 2

The invention of the fourth embodiment is described next on the basis of Example E5 and Comparative Example E2 manufactured in the manner described below.

EXAMPLE E5

A solid electrolytic capacitor was fabricated as follows by using a separator containing a PVA polymer as a binder and containing 49 wt % of PET fiber as the main fiber. An electrode-forming device was connected to the cathode foil and the anode foil on whose surface an oxide film layer had been formed, and both electrode foils were wound with the interposed separator to form a capacitor element whose element shape was 5φ×3 L. The capacitor element was immersed for 40 minutes in ammonium dihydrogen phosphate, and chemical repair was carried out. After the chemical repair, the capacitor element was dried at 100° C., immersed for three minutes at normal temperature in an aqueous solution of 0.5 wt % dodecylbenzenesulfonic acid, and heated at 150° C.

EDT and an ethanol solution of 45% ferric p-toluenesulfonate were mixed in a container, and the capacitor element was immersed for 10 seconds in the mixed liquid, held in a state of reduced pressure of about 250 mmHg, and subsequently heated for 60 minutes at 120° C. under the same conditions. A PEDT polymerization reaction was induced in the capacitor element to form a solid electrolyte layer.

The capacitor element was inserted into a cylindrical outer case with a closed end, and sealing rubber was mounted in the open-end portion and sealed with a tightening operation. Aging was thereafter carried out to form a solid electrolytic capacitor. The rated voltage of the solid electrolytic capacitor was 6.3 WV, and the rated capacity was 180 µF.

COMPARATIVE EXAMPLE E2

Chemical repair was carried out without immersion in dodecylbenzenesulfonic acid solution to form an electroconductive polymer. Other conditions and steps were the same as Example E5.

[Comparison of the Results]

When the initial characteristics of the solid electrolytic capacitors of Example E5 and comparative example E2 obtained with the above-described method were investigated, the results shown in Table 6 were obtained.

TABLE 6

| | DBS CONCENTRATION (%) | INITIAL CHARACTERISTICS | |
| --- | --- | --- | --- |
| | | CAP (µF) | ESR (Ω/100 kHz) |
| EXAMPLE E5 | 0.5 | 185 | 0.013 |
| COMPARATIVE EXAMPLE E2 | 0 | 180 | 0.015 |

It is apparent from Table 6 that in Example E5, in which a separator containing PVA polymer was used and a dodecylbenzenesulfonic acid solution was added to the capacitor element, the results were superior in comparison with the Comparative Example E2.

(F) Fifth Embodiment

The present embodiment is a modified example of the third embodiment described above. A capacitor element is formed using a separator containing a compound with a vinyl group, and the additive that is added to the capacitor element is sodium naphthalenesulfonate (NPS). It was found in this case as well that the same operation and effects as the third embodiment can be obtained.

(F-1) Method for Manufacturing the Solid Electrolytic Capacitor

The method for manufacturing the solid electrolytic capacitor in the fifth embodiment is described below. That is, a cathode foil and an anode foil, with an oxidized film layer formed on the surface and a separator containing a compound with a vinyl group interposed therebetween, are wound together to form a capacitor element, and the capacitor element is subjected to chemical repair. Next, a solution of sodium naphthalenesulfonate is used to impregnate the capacitor element, a conjugate composed of a compound with a vinyl group and sodium naphthalenesulfonate is formed, the capacitor element is thereafter immersed in a mixed liquid that was prepared by mixing a polymerizable monomer and an oxidizing agent together with a predetermined solvent, and a polymerization reaction involving the electroconductive polymer is induced in the capacitor element to form a solid electrolyte layer. The capacitor element is then inserted in an outer case; sealing rubber is mounted in the open-end portion and sealed with a tightening operation; and the unit is thereafter aged to form a solid electrolytic capacitor.

(F-2) Separator

The separator used in the present embodiment is preferably the same separator that is described in the section titled "(D-2) Separator" of the third embodiment.

(F-3) Sodium Naphthalenesulfonate (NPS)

Water, alcohol, or the like is preferably used as the solvent for the sodium naphthalenesulfonate used in the present invention. The concentration of the sodium naphthalenesulfonate is preferably 0.1 wt % to 5 wt %, and even more preferably 0.2 wt % to 2 wt %. When the concentration of the sodium naphthalenesulfonate solution is not in this range, the layer of the conjugate of NPS and PVA is thin, so the electrostatic capacity, improvement in the ESR characteristics, improvement in the withstand voltage, and LC suppression effect are all diminished. When the concentration of the sodium naphthalenesulfonate solution exceeds this range, the layer of the conjugate of NPS and PVA is excessively thick, and the electroconductive characteristics of the layer are reduced, so the electrostatic capacity and the ESR characteristics are also diminished.

(F-4) Method for Adding NPS to the Capacity Element

A method of immersing a capacitor element in the sodium naphthalenesulfonate solution, or a method of discharging the sodium naphthalenesulfonate solution over the capacitor element may be used for adding the sodium naphthalenesulfonate to the capacitor element.

It was found that when sodium naphthalenesulfonate is added to the capacitor element and heating treatment is performed thereafter, the initial characteristics improve. It is thought that the reason for this is that the compound with a vinyl group contained in the separator elutes into the capacitor element and the hydrophobicity of the end groups thereof increases, so the adhesiveness of the oxide film and the solid electrolyte improves. The heating temperature is preferably 120 to 250° C., and is more preferably 150 to 200° C. When the heating temperature is not in this range, the effect is reduced. This is thought to be due to the fact that when the heating temperature is less than 120° C., reaction that increases the hydrophobicity of the end groups of the compound with a vinyl group does not adequately progress, and when the heating temperature exceeds 250° C., the thermal degradation of the compound with a vinyl group takes place and the effect is reduced.

(F-5) Timing for Adding NPS to the Capacity Element

The present inventors thoroughly researched the timing for adding the sodium naphthalenesulfonate to the capacitor element, and, as a result, it was apparent that the addition may be made at a stage prior to the step for forming an electroconductive polymer, in the same manner as the third embodiment, or at any other stage. In other words, the timing may be prior to chemical repair, as described above, or the compound may be allowed to deposit on the electrode foils prior to forming the capacitor element, and the methods (1) to (3) described below, for example, may be considered. The method in (1) corresponds to the manufacturing method described above.

The most advantageous of the methods (1) to (3) described below is method (1), in which an anode foil and cathode foil are wound while a separator to which a compound with a vinyl group has been added is interposed therebetween to form a capacitor element, the capacitor element is subjected to chemical repair, the capacitor element is then impregnated with a solution of sodium naphthalenesulfonate, a conjugate composed of sodium naphthalenesulfonate and a compound with a vinyl group is formed, and the polymerization reaction of the electroconductive polymer is thereafter brought about in the capacitor element to form a solid electrolyte layer.

Application of the methods described below may be made by substituting a solution of sodium naphthalenesulfonate for the solution of the borate compound of FIGS. 2 to 4 shown in the third embodiment.

(1) After Chemical Repair . . . Refer to FIG. 2

This method is carried out in the following order: chemical conversion, capacitor element formation using a separator containing a compound with a vinyl group, chemical repair, immersion in a solution of sodium naphthalenesulfonate, impregnation with a polymerizable monomer and an oxidizing agent, polymerization, insertion in an outer case, resin sealing, and aging.

(2) After Capacitor Element Formation, But Prior to Chemical Repair . . . Refer to FIG. 3

This method is carried out in the following order: chemical conversion, capacitor element formation using a separator containing a compound with a vinyl group, immersion in a solution of sodium naphthalenesulfonate, chemical repair, impregnation with a polymerizable monomer and an oxidizing agent, polymerization, insertion in an outer case, resin sealing, and aging.

(3) Prior to Capacitor Element Formation . . . Refer to FIG. 4

This method is carried out in the following order: chemical conversion, immersion of at least one of the electrode foils in a solution of sodium naphthalenesulfonate (or application and drying thereafter), capacitor element formation using a separator containing a compound with a vinyl group, chemical repair, impregnation with a polymerizable monomer and an oxidizing agent, polymerization, insertion in an outer case, resin sealing, and aging.

The concentration of the solution of sodium naphthalenesulfonate, temperature, impregnation time, drying temperature, drying time, and other parameters in these methods are the same as described above.

(F-6) EDT and Oxidizing Agent

When EDT is used as the polymerizable monomer, an EDT monomer can be used as the EDT with which the capacitor element is impregnated, but a monomer solution in which EDT and a volatile solvent are mixed at a volume ratio of 1:0 to 1:3 may also be used.

Pentane or another hydrocarbon, tetrahydrofuran or another ether, ethyl formate or another ester, acetone or another ketone, methanol or another alcohol, or acetonitrile or another nitrogen compound may be used as the volatile solvent, but preferably used among these is methanol, ethanol, acetone, or the like.

Ferric p-toluenesulfonate dissolved in ethanol, or an aqueous solution of periodic acid or iodic acid can be used as the oxidizing agent, but the concentration of the oxidizing agent with respect to the solvent is preferably 40 to 57 wt %, and is more preferably 45 to 57 wt %. The ESR decreases with increased concentration of the oxidizing agent with respect to the solvent. A volatile solvent used for the above-described monomer solutions may be used as the solvent for the oxidizing agent, and among these ethanol is advantageous. The reason that ethanol is advantageous as the solvent for the oxidizing agent is believed to be that the vapor pressure is low, so evaporation easily occurs, and the remaining amount is small.

(F-7) Reduced Pressure

It is even more preferable to reduce the pressure in the polymerization step. The reason for this is that when the pressure is reduced during heat polymerization, residual matter can be evaporated away together with polymerization. The pressure is preferably reduced to about 10 to 360 mmHg.

(F-8) Impregnation Step

The time for impregnating the capacitor element with the mixed liquid is determined by the size of the capacitor element, but 5 seconds or more is preferred for a capacitor element with a size of about $\phi 5 \times 3$ L, and 10 seconds or more is preferred for a capacitor element with a size of about $\phi 9 \times 5$ L. Impregnation for 5 seconds is required at minimum. There are no drawbacks to the characteristics even if impregnation is carried out over a long period of time.

It is advantageous to keep the pressure reduced after impregnation has been performed in this manner. It is thought that the reason for this is that the residual amount of volatile solvent is reduced. The reduced pressure conditions are the same as the reduced pressure conditions in the above-described polymerization step.

(F-9) Chemical Conversion Solution for Chemical Repair

Ammonium dihydrogen phosphate, diammonium hydrogen phosphate, or another phosphate-based chemical conversion solution; ammonium borate or another boric acid-based chemical conversion solution; or ammonium adipate or another adipic acid-based chemical conversion solution may be used as the chemical conversion solution for chemical repair, but preferably used among these is ammonium dihydrogen phosphate. The immersion time is preferably 5 to 120 minutes.

(F-10) Other Polymerizable Monomers

The polymerizable monomer used in the present invention may be, in addition to the above-described EDT, a thiophene derivative, aniline, pyrrole, furan, acetylene, or a derivative thereof other than EDT, as long as oxidation polymerization is carried out with a predetermined oxidizing agent to form a polymerizable monomer. Substances with the structural formula shown in FIG. 1 may be used for the thiophene derivative.

(F-11) Operation and Effect of the Fifth Embodiment

As described above, degradation of the withstand voltage characteristics due to lead-free reflow can be prevented, and the ratio of shorting occurrence in the aging step can be considerably reduced by forming a capacitor element using a separator containing a compound with a vinyl group, and adding sodium naphthalenesulfonate to the capacitor element at a predetermined time.

It is thought that the reason that such effects can be obtained is that by allowing the compound with a vinyl group contained in the separator to elute into the capacitor element to form a conjugate with sodium naphthalenesulfonate or another hydrogen bond in the capacitor element, and allowing this conjugate to deposit on the oxide film of the electrode foils to form a layer, the adhesiveness of the oxide film and the solid electrolyte improves, and because the withstand voltage of this layer is high, the withstand voltage of the capacitor is also improved.

Allowing the compound with a vinyl group added to the separator to elute as in the present invention is more advantageous than adding a compound with a vinyl group to the element after formation of the capacitor element in that the conjugate with sodium naphthalenesulfonate uniformly deposits on the oxide film.

In particular, it is thought that when PVA and sodium naphthalenesulfonate are used, a conjugate composed of an ester compound is formed, and this ester compound deposits on the surface of the film without immersion in a dielectric film, so adequate characteristics can be obtained because an electron-blocking film is formed.

As described above, it is thought that when heating treatment is carried out after adding sodium naphthalenesulfonate, the bonding characteristics of the end group of the compound with a vinyl group eluted from the separator with respect to the dielectric oxide layer and the electroconductive polymer are improved, the initial characteristics, and the electrostatic capacity and ESR characteristics in particular, are enhanced, the withstand voltage is improved, and the LC is reduced.

(F-12) Examples Related to the Fifth Embodiment

The invention of the fifth embodiment is described next on the basis of Examples F1 to F4 and Comparative Example F1 manufactured in the manner described below.

EXAMPLE F1

A solid electrolytic capacitor was fabricated as follows by using a separator containing PVA polymer as a binder and containing 49 wt % of PET fiber as the main fiber. An electrode-forming device was connected to the cathode foil and the anode foil on whose surface an oxide film layer had been formed, and both electrode foils were wound with the interposed separator to form a capacitor element whose element shape was $7\phi \times 5$ L. The capacitor element was immersed for 40 minutes in ammonium dihydrogen phosphate, and chemical repair was carried out. After the chemical repair, the capacitor element was dried at 100° C., immersed for three minutes at normal temperature in an aqueous solution of 0.1-wt % sodium naphthalenesulfonate, and heated at 150° C.

EDT and an ethanol solution of 45% ferric p-toluenesulfonate were mixed in a container, and the capacitor element was immersed for 10 seconds in the mixed liquid, held in a state of reduced pressure of about 250 mmHg, and subsequently heated for 60 minutes at 120° C. under the same conditions. A PEDT polymerization reaction was induced in the capacitor element to form a solid electrolyte layer.

The capacitor element was inserted into a cylindrical outer case with a closed end, and sealing rubber was mounted in the open-end portion and sealed with a tightening operation. Aging was thereafter carried out for 120 minutes at 150° C. with an applied voltage of 33 V to form a solid electrolytic capacitor. The rated voltage of the solid electrolytic capacitor was 25 WV, and the rated capacity was 22 µF.

EXAMPLE F2

The concentration of the sodium naphthalenesulfonate solution was 0.5 wt %. A solid electrolytic capacitor was fabricated with the other parameters the same as Example F1.

EXAMPLE F3

The concentration of the sodium naphthalenesulfonate solution was 2.0 wt %. A solid electrolytic capacitor was fabricated with the other parameters the same as Example F1.

EXAMPLE F4

The concentration of the sodium naphthalenesulfonate solution was 5.0 wt %. A solid electrolytic capacitor was fabricated with the other parameters the same as Example F1.

COMPARATIVE EXAMPLE F1

Chemical repair was carried out without immersion in a solution of sodium naphthalenesulfonate to form an electroconductive polymer. Other conditions and steps were the same as Example F1.

[Comparison of the Results]

When the initial characteristics and the reflow characteristics of the solid electrolytic capacitors of Examples F1 to F4 and Comparative Example F1 obtained with the above-described method were investigated, the results shown in Table 7 were obtained. The reflow test was carried out by subjecting the capacitors to lead-free re-flowing at a peak temperature of 250° C. and keeping the capacitors for 30 seconds at no less than 230° C., and the leakage current was calculated.

TABLE 7

| | NPS CONCEN-TRATION (%) | INITIAL CHARACTERISTICS | | REFLOW CHARACTER-ISTIC |
|---|---|---|---|---|
| | | WITHSTAND VOLTAGE (V) | LC (µA) | LC (µA) |
| EXAMPLE F1 | 0.1 | 57 | 0.2 | 20 |
| EXAMPLE F2 | 0.5 | 57 | 0.3 | 10 |
| EXAMPLE F3 | 2.0 | 57 | 0.5 | 10 |
| EXAMPLE F4 | 5.0 | 55 | 0.1 | 8 |
| COMPARATIVE EXAMPLE F1 | 0 | 54 | 2.0 | 30 |

It is apparent from Table 7 that in Examples F1 to F4, in which a separator containing PVA polymer was used and a dodecylbenzenesulfonic acid solution was added to the capacitor element, the withstand voltage was 55 to 57 V, each resulting in an improvement in comparison with Comparative Example F1 (54 V). In particular, in the Examples F1 to F3, in which the NPS concentration was 0.1 to 2.0%, the withstand voltage exhibited a high value of 57 V.

The initial and after-reflow leakage currents decreased to 0.1 to 0.5 µA and 8 to 20 µA, respectively, while those for Comparative Example F1 were 2 µA and 30 µA.

(G) Sixth Embodiment

The present inventors, as a result of thoroughgoing research to achieve the fourth object described above, which is to improve the withstand voltage of a solid electrolytic capacitor and to inhibit LC fluctuation after reflow, perfected the invention described in the sixth embodiment. Specifically, the inventors focused on the mechanism of electrical conductivity and studied electrical conductivity in electroconductive polymers and other solid polymers.

Electron emission is commonly largely divided into two types: emission by tunneling electrons and emission by electrons that pass over (passage of electrons that does not depend on film damage) the potential barrier, and it is possible that the leakage current in the solid electrolytic capacitor is caused by electrons that pass over the potential barrier, rather than being a result of a shorted condition.

It is possible that the causes of an increase in LC after re-flowing are mechanical stress (physical stress) caused by the generation of gas during re-flowing, and chemical stress (attack of the oxidizing agent, passage of electrons, or the like).

In other words, in a solid electrolytic capacitor with a higher withstand voltage, shorting occurs when electrons increase in number, a flooded state is created, and a tunneling condition occurs. An increase in LC during reflow is due to the passage of electrons rather than insulation breakdown, so the common factor in both cases is electrons. Therefore, electrons can be inhibited in their ability to pass over the potential barrier, and an increase in LC during re-flowing due to a higher withstand voltage can be reduced by electron blocking.

Based on this knowledge, and as a result of thoroughgoing research regarding a technique that can prevent electrons from passing over the potential barrier, the present inventors discovered that adding a compound with a vinyl group to the separator, forming a capacitor element using this separator, and adding polyimide silicon to the capacitor element makes it possible to improve the withstand voltage of the product and to inhibit an increase in LC after re-flowing.

(G-1) Method for Manufacturing the Solid Electrolytic Capacitor

The method for manufacturing the solid electrolytic capacitor in the sixth embodiment is described below. That is, a cathode foil and an anode foil, with an oxidized film layer formed on the surface and a separator containing a compound with a vinyl group interposed therebetween, are wound together to form a capacitor element, and the capacitor element is subjected to chemical repair. The capacitor element is thereafter immersed in a solution in which polyimide silicon has been dissolved with a ketone-based solvent to a concentration of 10 wt % or less, preferably 1.5 to 9 wt %, and more preferably 5 to 8 wt %. The capacitor element is removed, the solvent is evaporated at 40 to 100° C., and the capacitor element is then subjected to heat treatment at 150 to 200° C.

Next, the capacitor element is immersed in a mixed liquid of a polymerizable monomer and an oxidizing agent, and a polymerization reaction involving the electroconductive polymer is induced in the capacitor element to form a solid electrolyte layer. The capacitor element is then housed in an outer case, and the open-end portion is sealed with sealing rubber to form a solid electrolytic capacitor.

(G-2) Polyimide Silicon

The solvent that is used to dissolve polyimide silicon is preferably a ketone-based solvent which has good solubility for polyimide silicon, and cyclohexanone, acetone, methyl ethyl ketone, or the like may be used.

The concentration of the polyimide silicon is preferably 10 wt % or less, is more preferably 1.5 to 9 wt %, and is even more preferably 5 to 8 wt %. When the concentration of the polyimide silicon is less than this range, the withstand voltage is insufficient; and when the concentration exceeds this range the electrostatic capacity decreases.

(G-3) Separator

The separator used in the present embodiment is preferably the same separator that is described in the section titled "(D-2) Separator" of the third embodiment.

(G-4) EDT and Oxidizing Agent

When EDT is used as the polymerizable monomer, an EDT monomer can be used as the EDT with which the capacitor element is impregnated, but a monomer solution in which EDT and a volatile solvent are mixed at a volume ratio of 1:0 to 1:3 may also be used.

Pentane or another hydrocarbon, tetrahydrofuran or another ether, ethyl formate or another ester, acetone or another ketone, methanol or another alcohol, or acetonitrile or another nitrogen compound may be used as the volatile solvent, but preferably used among these is methanol, ethanol, acetone, or the like.

Ferric p-toluenesulfonate dissolved in ethanol, or an aqueous solution of periodic acid or iodic acid can be used as the oxidizing agent, but the concentration of the oxidizing agent with respect to the solvent is preferably 40 to 65 wt %, and is more preferably 45 to 57 wt %. The ESR decreases with increased concentration of the oxidizing agent with respect to the solvent. A volatile solvent used for the above-described monomer solutions may be used as the solvent for the oxidizing agent, and among these ethanol is advantageous. The reason that ethanol is advantageous as the solvent for the oxidizing agent is believed to be that the vapor pressure is low, so evaporation easily occurs, and the remaining amount is small.

(G-5) Chemical Conversion Solution for Chemical Repair

Ammonium dihydrogen phosphate, diammonium hydrogen phosphate, or another phosphate-based chemical conversion solution; ammonium borate or another boric acid-based chemical conversion solution; or ammonium adipate or another adipic acid-based chemical conversion solution may be used as the chemical conversion solution for chemical repair, but preferably used among these is ammonium dihydrogen phosphate. The immersion time is preferably 5 to 120 minutes.

(G-6) Other Polymerizable Monomers

The polymerizable monomer used in the present invention may be, in addition to the above-described EDT, a thiophene derivative, aniline, pyrrole, furan, acetylene, or a derivative thereof other than EDT, as long as oxidation polymerization is carried out with a predetermined oxidizing agent to form a polymerizable monomer. Substances with the structural formula shown in FIG. 1 may be used for the thiophene derivative.

(G-7) Operation and Effect of the Sixth Embodiment

Following are the possible reasons that withstand voltage can be improved and an inhibiting effect on LC fluctuation can be obtained after re-flowing with the configuration of the present invention.

In other words, it is possible that a film (hereinafter referred to as "electron-blocking layer) that prevents electrons form passing over the potential barrier and that comprises a PVA layer and a polyimide silicon layer is formed on the surface of the oxide film by immersing the capacitor element in a polyimide silicon solution after chemical repair.

This electron-blocking layer improves the withstand voltage, prevents the attack of the oxidizing agent on the foil, and reduces the initial LC. The effect of inhibiting an increase in LC during reflow can be obtained with a covering of Tabcoat. It is possible to control the withstand voltage by making the electrostatic capacity and ESR largely unaffected by other factors and controlling the thickness of this electron-blocking layer. The VF of foil currently used can be reduced, so solid electrolytic capacitors can be made smaller, the capacity increased, and other beneficial effects obtained.

(G-8) Examples Related to the Sixth Embodiment

The present invention will now be described in greater detail on the basis of Examples and a conventional example manufactured in the manner described below.

EXAMPLE G1

A solid electrolytic capacitor was fabricated as follows by using a separator containing PVA polymer as a binder and containing 49 wt % of PET fiber as the main fiber. An electrode-forming device was connected to the cathode foil and the anode foil on whose surface an oxide film layer had been formed, and both electrode foils were wound with the interposed separator to form a capacitor element whose element shape was 7$\phi$×5 L. The capacitor element was immersed for 40 minutes in ammonium dihydrogen phosphate, and chemical repair was carried out. The capacitor element was then immersed in a 2 wt % cyclohexanone solution of polyimide silicon, removed, and thereafter heated for one hour at 170° C.

Next, EDT and an ethanol solution of 40 wt % ferric p-toluenesulfonate were mixed in a container, the solution was injected so as to achieve a weight ratio of 1:3 to prepare a mixed liquid, and the capacitor element was immersed for 10 seconds in the mixed liquid to impregnate EDT and an oxidizing agent in the capacitor element. The capacitor element was then left for one hour in a thermostat at 120° C., and a PEDT polymerization reaction was induced in the capacitor element to form a solid electrolyte layer. The capacitor element was thereafter housed in a cylindrical aluminum case with a closed end, sealed with sealing rubber to form a solid electrolytic capacitor.

EXAMPLE G2

A capacitor element was immersed in 6 wt % cyclohexanone solution of polyimide silicon, then removed, and subjected to heat treatment for one hour at 170° C. A solid electrolytic capacitor was fabricated with the other parameters the same as Example G1.

EXAMPLE G3

A capacitor element was immersed in 10 wt % cyclohexanone solution of polyimide silicon, then removed, and subjected to heat treatment for one hour at 170° C. A solid electrolytic capacitor was fabricated with the other parameters the same as Example G1.

CONVENTIONAL EXAMPLE G1

The capacitor element was not immersed in a cyclohexanone solution of polyimide silicon, and a solid electrolytic capacitor was fabricated with the other parameters the same as Example G1

[Comparison of the Results]

When the electrical characteristics of Examples G1 to G3 and conventional example G1 obtained with the above-described method were investigated, the results shown in Table 8 were obtained. The decrease in initial capacity (ΔCap) is shown as a percent of a blank (conventional example).

TABLE 8

|  | CONTENT OF ADDITIVE (wt %) | INITIAL CHARACTERISTICS | | | LC (μA) | |
| --- | --- | --- | --- | --- | --- | --- |
|  |  | WITHSTAND VOLTAGE (V) | ESR (mΩ) | Δ CAP (%) | INITIAL | AFTER REFLOW |
| EXAMPLE G1 | 2.0 | 66 | 25.0 | 0 | 0.1 | 5 |
| EXAMPLE G2 | 6.0 | 74 | 26.0 | −18 | 0.1 | 0.9 |
| EXAMPLE G3 | 10.0 | 75 | 26.5 | −30 | 0.1 | 0.9 |
| COMPARATIVE EXAMPLE G1 | — | 58 | 25.0 | 0 | 0.5 | 150 |

It is apparent from Table 8 that in all the Examples E1 to E3, in which the capacitor element was immersed in a polyimide silicon solution after chemical repair, the withstand voltage was improved, and the LC after re-flowing was considerably reduced in comparison with the conventional example G1.

INDUSTRIAL APPLICABILITY

In accordance with the invention described in the first embodiment, a solid electrolytic capacitor and a manufacturing method thereof can be provided in which it is possible to reduce the ESR and to improve the electrostatic capacity.

In accordance with the invention described in the second embodiment, a solid electrolytic capacitor and a manufacturing method thereof can be provided in which it is possible to reduce the ESR and to improve the electrostatic capacity and withstand voltage by using a separator containing 10 wt % or more of a compound with a vinyl group as a binder, and adding one or two compounds selected from acetylene diol and dimethyl lauryl amine oxide to the capacitor element prior to impregnation with a polymerizable monomer and an oxidizing agent.

In accordance with the invention described in the fourth to fifth embodiments, a solid electrolytic capacitor with adequate initial characteristics can be provided in which a degradation of the withstand voltage characteristics due to re-flowing can be prevented, and the yield when manufacturing a high withstand voltage product can improved, and also to provide a method for manufacturing this capacitor.

In accordance with the invention described in the sixth embodiment, a solid electrolytic capacitor and a manufacturing method thereof can be provided in which the withstand voltage is improved and LC fluctuation after re-flowing is inhibited.

What is claimed is:

1. A solid electrolytic capacitor comprising a capacitor element having an anode foil and a cathode foil wound with a separator interposed therebetween, the capacitor element being provided with a solid electrolyte layer of an electro-conductive polymer by impregnating the capacitor element with a polymerizable monomer and an oxidizing agent, wherein a compound with a vinyl group is added to the separator, a borate compound is added to the capacitor element and heated, and a conjugate composed of a borate compound and the compound with a vinyl group is added to the capacitor element.

2. The solid electrolytic capacitor according to claim 1, characterized in that the borate compound is boric acid or borax.

3. The solid electrolytic capacitor according to claim 1, characterized in that the separator contains as a binder 10 wt % or more of a compound with a vinyl group, and a predetermined coupling agent is added to the capacitor element prior to impregnation with the polymerizable monomer and the oxidizing agent.

4. The solid electrolytic capacitor according to claim 3, characterized in that the coupling agent is a single coupling agent, or two or more coupling agents selected from a silane coupling agent, a titanium coupling agent, and an aluminum coupling agent.

5. The solid electrolyte capacitor according to claim 1 wherein the oxidizing agent includes one of Ferric p-toluenesulfonate, periodic acid and iodic acid.

6. The solid electrolytic capacitor according to claim 5 wherein the borate compound is selected from one of an ammonium salt of boric acid, metal salt of boric acid and an ester of boric acid.

7. The solid electrolyte capacitor according to claim 6 wherein the polymerizable monomer is 3,4-ethylene dioxythiophane.

8. The solid electrolyte capacitor according to claim 7 wherein acetal alboxy aluminum diisopropylate is added to the capacitor element.

9. A method for manufacturing a solid electrolytic capacitor characterized by the steps of;

winding an anode foil and a cathode foil with a separator composed of a compound with a vinyl group interposed therebetween to form a capacitor element;

impregnating the capacitor element with a solution of a borate compound; and heating the capacitor element to form a conjugate composed of the borate compound and the compound with a vinyl group, and a solid electrolyte layer comprising an electroconductive polymer is formed thereafter.

10. The method for manufacturing a solid electrolytic capacitor according to claim 9, characterized in that a separator containing as a binder 10 wt % or more of a compound with a vinyl group is used as the separator, and a predetermined coupling agent is added to the capacitor element prior to impregnation with a polymerizable monomer and an oxidizing agent.

11. The method for manufacturing a solid electrolytic capacitor according to claim 10, characterized in that the predetermined coupling agent is a single coupling agent, or two or more coupling agents selected from a silane coupling agent, a titanium coupling agent, and an aluminum coupling agent.

12. The method for manufacturing a solid electrolytic capacitor according to claim 11 wherein the capacitor element is heated within a range of 150° C. to 200° C.

13. The method for manufacturing a solid electrolytic capacitor according to claim 12 wherein the oxidizing agent is added with a solvent that is between 45 wt % to 57 wt %.

14. The method for manufacturing a solid electrolytic capacitor according to claim 10 wherein the oxidizing agent includes one of Ferric p-toluenesulfonate, periodic acid and iodic acid.

15. The method for manufacturing a solid electrolytic capacitor according to claim 10 wherein the polymerizable monomer is 3,4-ethylene dioxythiophane.

16. The method for manufacturing a solid electrolytic capacitor according to claim 9 wherein the borate compound is selected from one of an ammonium salt of boric acid, metal salt of boric acid and an ester of boric acid.

17. The method for manufacturing a solid electrolytic capacitor according to claim 9 wherein acetal alboxy aluminum diisopropylate is added to the capacitor element.

18. A solid electrolytic capacitor comprising;
a capacitor element having an anode foil and a cathode foil wound with a separator interposed therebetween, the capacitor element including a coupling agent selected from a group consisting of a silane coupling agent, a titanium coupling agent, and an aluminum coupling agent, the capacitor element being provided with a solid electrolyte layer of an electroconductive polymer by impregnating the capacitor element with a polymerizable monomer and an oxidizing agent, wherein a compound with a vinyl group is added to the separator, a borate compound is added to the capacitor element and heated, and a conjugate composed of a borate compound and the compound with a vinyl group is provided in the capacitor element.

19. The solid electrolytic capacitor according to claim 18, characterized in that the borate compound is boric acid or borax.

20. The solid electrolytic capacitor according to claim 19, characterized in that the separator contains as a binder 10 wt % or more of a compound with a vinyl group, and a predetermined coupling agent is added to the capacitor element prior to impregnation with the polymerizable monomer and the oxidizing agent.

* * * * *